United States Patent
Takahashi et al.

(10) Patent No.: US 9,967,019 B2
(45) Date of Patent: May 8, 2018

(54) COMMUNICATION SYSTEM, COMMUNICATION METHOD, BASE STATION DEVICE, AND TERMINAL DEVICE

(71) Applicant: Panasonic Corporation, Osaka (JP)

(72) Inventors: Hiroshi Takahashi, Kanagawa (JP); Naganori Shirakata, Kanagawa (JP); Masataka Irie, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 0 days. days.

(21) Appl. No.: 15/445,399

(22) Filed: Feb. 28, 2017

(65) Prior Publication Data
US 2017/0264357 A1 Sep. 14, 2017

(30) Foreign Application Priority Data
Mar. 14, 2016 (JP) .................................. 2016-050121

(51) Int. Cl.
*H04B 7/08* (2006.01)
*H04B 17/318* (2015.01)
(Continued)

(52) U.S. Cl.
CPC ......... *H04B 7/0851* (2013.01); *H04B 7/0617* (2013.01); *H04B 7/0695* (2013.01);
(Continued)

(58) Field of Classification Search
CPC .. H04B 7/0851; H04B 17/318; H04B 17/336; H04B 7/0617; H04W 84/12
See application file for complete search history.

(56) References Cited

U.S. PATENT DOCUMENTS 8,842,640 B2 * 9/2014 Jeon ..................... H04B 7/0413
370/328
9,160,428 B2 * 10/2015 Liu ...................... H04B 7/0695
(Continued)

FOREIGN PATENT DOCUMENTS

JP 2012-507946 A 3/2012
WO 2010/053738 A2 5/2010

OTHER PUBLICATIONS

IEEE Computer Society, "Part11:Wireless LAN Medium Access Control(MAC) and Physical Layer(PHY) Specifications Amendment 3: Enhancements for Very High Throughput in the 60 GHz Band", IEEE Std 802.11ad (TM), Dec. 2012.

*Primary Examiner* — Jean B Corrielus
(74) *Attorney, Agent, or Firm* — Seed IP Law Group LLP

(57) ABSTRACT

Provided is a communication system achieving favorable beamforming training even in an environment where multiple wireless communication networks adjacently exist. In this communication system, in an RXSS, an STA measures received signal qualities of respective first training frames received from an AP and ranks the received signal qualities. In a TXSS following the RXSS, the STA measures received signal qualities of respective third training frames received from the AP and ranks the received signal qualities. The STA transmits fourth training frames respectively including the measured received signal qualities of the third training frames based on the ranks of the received signal qualities of the first training frames.

10 Claims, 20 Drawing Sheets

(51) Int. Cl.
*H04B 17/336* (2015.01)
*H04B 7/06* (2006.01)
*H04W 84/12* (2009.01)

(52) U.S. Cl.
CPC ......... *H04B 17/318* (2015.01); *H04B 17/336* (2015.01); *H04W 84/12* (2013.01)

(56) References Cited

U.S. PATENT DOCUMENTS

| | | | |
|---|---|---|---|
| 9,621,249 B2* | 4/2017 | Cordeiro | H04B 7/0623 |
| 2009/0046765 A1* | 2/2009 | Xia | H04B 7/0617 |
| | | | 375/141 |
| 2010/0215027 A1* | 8/2010 | Liu | H04B 7/0695 |
| | | | 370/338 |
| 2012/0122392 A1* | 5/2012 | Morioka | H04B 7/0695 |
| | | | 455/25 |
| 2016/0149633 A1* | 5/2016 | Sanderovich | G01S 5/0289 |
| | | | 375/267 |

* cited by examiner

FIG. 5

| BEAM PATTERN | AP (INITIATOR) | | STA (RESPONDER) | |
|---|---|---|---|---|
| | TRANSMISSION BEAM ID | RECEPTION BEAM ID | TRANSMISSION BEAM ID | RECEPTION BEAM ID |
| #0 | #itx0 | #irx0 | #rtx0 | #rrx0 |
| #1 | #itx1 | #irx1 | #rtx1 | #rrx1 |
| #2 | #itx2 | #irx2 | #rtx2 | #rrx2 |
| #3 | #itx3 | #irx3 | #rtx3 | #rrx3 |
| #4 | #itx4 | #irx4 | #rtx4 | #rrx4 |
| #5 | #itx5 | #irx5 | #rtx5 | #rrx5 |
| — | #itx_select | #irx_select | #rtx_select | #rrx_select |

FIG. 10

| FRAME TYPE | ID OF BEAM USED FOR RECEPTION | RECEPTION SNR | RANK |
|---|---|---|---|
| 1st SSW (61A) | #rrx1 | 80 | 4 |
| 2nd SSW (61B) | #rrx2 | 90 | 2 |
| 3rd SSW (61C) | #rrx3 | 85 | 3 |
| 4th SSW (61D) | #rrx4 | 100 | 1 |
| 5th SSW (61E) | #rrx5 | 70 | 5 |

FIG. 11

| FRAME TYPE | TRANSMITTING WIRELESS COMMUNICATION DEVICE | AP (INITIATOR) | | STA (RESPONDER) | |
|---|---|---|---|---|---|
| | | TRANSMISSION BEAM ID | RECEPTION BEAM ID | TRANSMISSION BEAM ID | RECEPTION BEAM ID |
| GRANT (60) | INITIATOR | #itx0 | — | — | #rrx0 |
| 1st SSW (61A) | INITIATOR | #itx0 | — | — | #rrx1 |
| 2nd SSW (61B) | INITIATOR | #itx0 | — | — | #rrx2 |
| 3rd SSW (61C) | INITIATOR | #itx0 | — | — | #rrx3 |
| 4th SSW (61D) | INITIATOR | #itx0 | — | — | #rrx4 |
| 5th SSW (61E) | INITIATOR | #itx0 | — | — | #rrx5 |
| 6th SSW (62A) | RESPONDER | — | #irx1 | #rtx0 | — |
| 7th SSW (62B) | RESPONDER | — | #irx2 | #rtx0 | — |
| 8th SSW (62C) | RESPONDER | — | #irx3 | #rtx0 | — |
| 9th SSW (62D) | RESPONDER | — | #irx4 | #rtx0 | — |
| 10th SSW (62E) | RESPONDER | — | #irx5 | #rtx0 | — |
| SSW-FEEDBACK (63) | INITIATOR | #itx0 | — | — | #rrx_select |
| SSW-ACK (64) | RESPONDER | — | #irx_select | #rtx0 | — |

FIG. 14

| FRAME TYPE | TRANSMITTING WIRELESS COMMUNICATION DEVICE | AP (INITIATOR) | | STA (RESPONDER) | |
|---|---|---|---|---|---|
| | | TRANSMISSION BEAM ID | RECEPTION BEAM ID | TRANSMISSION BEAM ID | RECEPTION BEAM ID |
| GRANT (70) | INITIATOR | #itx0 | — | — | #rrx0 |
| 11th SSW (71A) | INITIATOR | #itx1 | — | — | #rrx0 |
| 12th SSW (71B) | INITIATOR | #itx2 | — | — | #rrx0 |
| 13th SSW (71C) | INITIATOR | #itx3 | — | — | #rrx0 |
| 14th SSW (71D) | INITIATOR | #itx4 | — | — | #rrx0 |
| 15th SSW (71E) | INITIATOR | #itx5 | — | — | #rrx0 |
| 16th SSW (72A) | RESPONDER | — | #irx0 | #rtx1 | — |
| 17th SSW (72B) | RESPONDER | — | #irx0 | #rtx2 | — |
| 18th SSW (72C) | RESPONDER | — | #irx0 | #rtx3 | — |
| 19th SSW (72D) | RESPONDER | — | #irx0 | #rtx4 | — |
| 20th SSW (72E) | RESPONDER | — | #irx0 | #rtx5 | — |
| SSW-FEEDBACK (73) | INITIATOR | #itx_select | — | — | #rrx0 |
| SSW-ACK (74) | RESPONDER | — | #irx_0 | #rtx_select | — |

FIG. 15

| FRAME TYPE | BEAM ID INCLUDED IN SSW RECEIVED | RECEPTION SNR MEASURED | RANK |
|---|---|---|---|
| 11th SSW (71A) | #itx1 | 30 | 5 |
| 12th SSW (71B) | #itx2 | 90 | 2 |
| 13th SSW (71C) | #itx3 | 80 | 3 |
| 14th SSW (71D) | #itx4 | 95 | 1 |
| 15th SSW (71E) | #itx5 | 60 | 4 |

FIG. 16

| SSW FRAME TRANSMITTED BY STA | ID OF BEAM USED FOR TRANSMISSION | MEASUREMENT RESULTS WRITTEN IN SSW | |
|---|---|---|---|
| | | BEAM ID | SNR |
| 16th SSW (72A) | #rtx1 | #itx5 | 60 |
| 17th SSW (72B) | #rtx2 | #itx2 | 90 |
| 18th SSW (72C) | #rtx3 | #itx3 | 80 |
| 19th SSW (72D) | #rtx4 | #itx4 | 95 |
| 20th SSW (72E) | #rtx5 | #itx1 | 30 | ns and Information-
COMMUNICATION SYSTEM, COMMUNICATION METHOD, BASE STATION DEVICE, AND TERMINAL DEVICE

BACKGROUND

1. Technical Field

The present disclosure relates to a communication system, a communication method, a base station device, and a terminal device which perform beamforming training to determine beam patterns to use for communications.

2. Description of the Related Art

Millimeter-wave communications, which use radio signals in the millimeter-wave spectrum (60 GHz for example), are in widespread use in recent years. Wireless communication standards for millimeter-wave communications include, for example, Wireless Gigabit (WiGig), WirelessHD (wireless high definition), ECMA-387, IEEE 802.15.3c, and IEEE 802.11ad.

Radio signals in the millimeter-wave spectrum have such radio properties as strong linearity and high free-space path loss. Due to such properties, typical millimeter communications use beamforming to control the directivity of radio signals using multiple antennas.

Beamforming is a technique for causing a directional beam to follow the position of a communication partner by controlling the direction and width of the beam. For example, connection can be established with multiple communication partners (wireless communication devices) by using beamforming to switch the direction of a beam for each of the communication partners by time division.

IEEE 802.11ad is an example of millimeter-wave wireless communication standards setting forth the beamforming technique (see IEEE 802.11ad-2012 IEEE Standard for Information Technology-Telecommunications and Information Exchange between systems-Local and Metropolitan networks-Specific requirements-Part 11: Wireless LAN Medium Access Control (MAC) and Physical Layer (PHY) Specifications Amendment 3: Enhancements for Very High Throughput in the 60 GHz Band (hereinafter referred to as Non-patent Literature 1)). Non-patent Literature 1 describes a method (beamforming protocol) for selecting a beam pattern used for communications from multiple beam patterns. Specifically, Non-patent Literature 1 describes selecting an optimal beam pattern for communication by causing wireless communication devices communicating with each other to transmit training frames containing information for selecting an optimal beam pattern to each other while changing beam patterns.

Further, Japanese Unexamined Patent Application Publication (Translation of PCT Application) No. 2012-507946 (hereinafter referred to as Patent Literature 1) describes an example of application of the beamforming technique. Specifically, in transmitting a training frame to a communication partner, a wireless communication device includes, in the training frame, part or all of a reception result of a training frame previously received from the communication partner so as to feed back the reception result.

In the beamforming protocol disclosed in Non-patent Literature 1, beam selection is made by a communication partner, not by a device that forms the beam patterns and transmits signals using the respective beam patterns (hereinafter referred to as a transmitter device). Specifically, a communication partner selects a beam pattern with the best received signal quality from beam patterns used to receive respective training frames and notifies the transmitter device of the ID of the selected beam pattern. On the other hand, in a high interference environment where, for example, multiple wireless communication devices exist around a transmitter device, it is preferable that the transmitter device select an optimal beam pattern considering the influence of the interference and the like. However, it is difficult for the transmitter device to know reception results of all training frames received by the communication partner and therefore to select an optimal beam pattern.

In the technique disclosed in Patent Literature 1, a communication partner feeds reception results of training frames back to the transmitter device. To do so, the communication partner includes the reception results in training frames and transmits the training frames. Consequently, the length of the training frames increases, leading to decreased communication efficiency.

SUMMARY

One non-limiting and exemplary embodiment facilitates providing a communication system, a method for controlling the communication system, a base station device, and a terminal device, with which beamforming training can be performed without increasing the frame length of training frames and decreasing communication efficiency even in an environment where multiple wireless communication networks adjacently exist.

In one general aspect, the techniques disclosed here feature a communication system comprising a terminal device and a base station device that wirelessly communicates with the terminal device, wherein: in a reception beamforming training period, the base station device transmits, in operation, a plurality of first training frames to the terminal device, the terminal device receives the first training frames by switching among a plurality of reception beam patterns, the terminal device, in operation, transmits a plurality of second training frames to the base station device, and the base station device, in operation, receives the second training frames by switching among a plurality of reception beam patterns; in a transmission beamforming training period following the reception beamforming training period, the base station device, in operation, transmits a plurality of third training frames to the terminal device by switching among a plurality of transmission beam patterns, the terminal device, in operation, receives the third training frames, the terminal device transmits a plurality of fourth training frames to the base station device by switching among a plurality of transmission beam patterns, and the base station device, in operation, receives the fourth training frames; the terminal device, in operation, measures first received signal qualities of the respective first training frames, determines first ranks of the respective reception beam patterns used for the first training frames based on the first received signal qualities measured, and sets the determined first ranks as second ranks of the respective transmission beam patterns used for the fourth training frames; the terminal device, in operation, measures third received signal qualities of the respective third training frames, and determines third ranks of the respective third received signal qualities measured; and the terminal device, in operation, transmits the third received signal qualities to the base station device in the respective fourth training frames by associating the third ranks with the second ranks in the respective fourth training frames.

According to the aspect of the present disclosure, beamforming training can be performed without increasing the frame length of training frames and decreasing communication efficiency even in an environment where multiple wireless communication networks adjacently exist.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 shows associations between beam patterns and transmission beam IDs and reception beam IDs of each of an AP and an STA;

FIG. 10 shows an example of the IDs of beams used by the STA to receive first to fifth SSW frames and measurement results of received signal quality;

FIG. 11 shows an example of beam patterns used by the AP and the STA in transmitting/receiving first to tenth SSW frames;

FIG. 14 shows an example of beam patterns used by each of the AP and the STA in transmitting/receiving 11th to 20th SSW frames;

FIG. 15 shows an example of the IDs of beams included in 11th to 15th SSW frames received by the STA and measurement results of received signal quality;

FIG. 16 shows an example of transmission beam IDs used by the STA to transmit the 16th to 20th SSW frames as well as a beam ID and received signal quality information included in each SSW frame;

DETAILED DESCRIPTION

Before a detailed description is given of an embodiment of the present disclosure, the basis of the present disclosure is provided.

In one example of a wireless communication network, a single base station (access point (AP)) manages wireless communications between the base station and multiple wireless terminal devices (stations (STAs)). When there is no other wireless communication network around a certain wireless communication network, an AP in the certain wireless communication network performs beamforming training to select an optimal beam for each of the STAs. By thus selecting a beam pattern that provides the best communication quality, the AP can optimize the communication quality (system throughput) in the wireless communication network.

On the other hand, when there is another wireless communication network around a certain wireless communication network, a communication area established by a beam pattern selected by the AP of the certain wireless communication network may overlap the communication area of the other wireless communication network.

Figure 1:
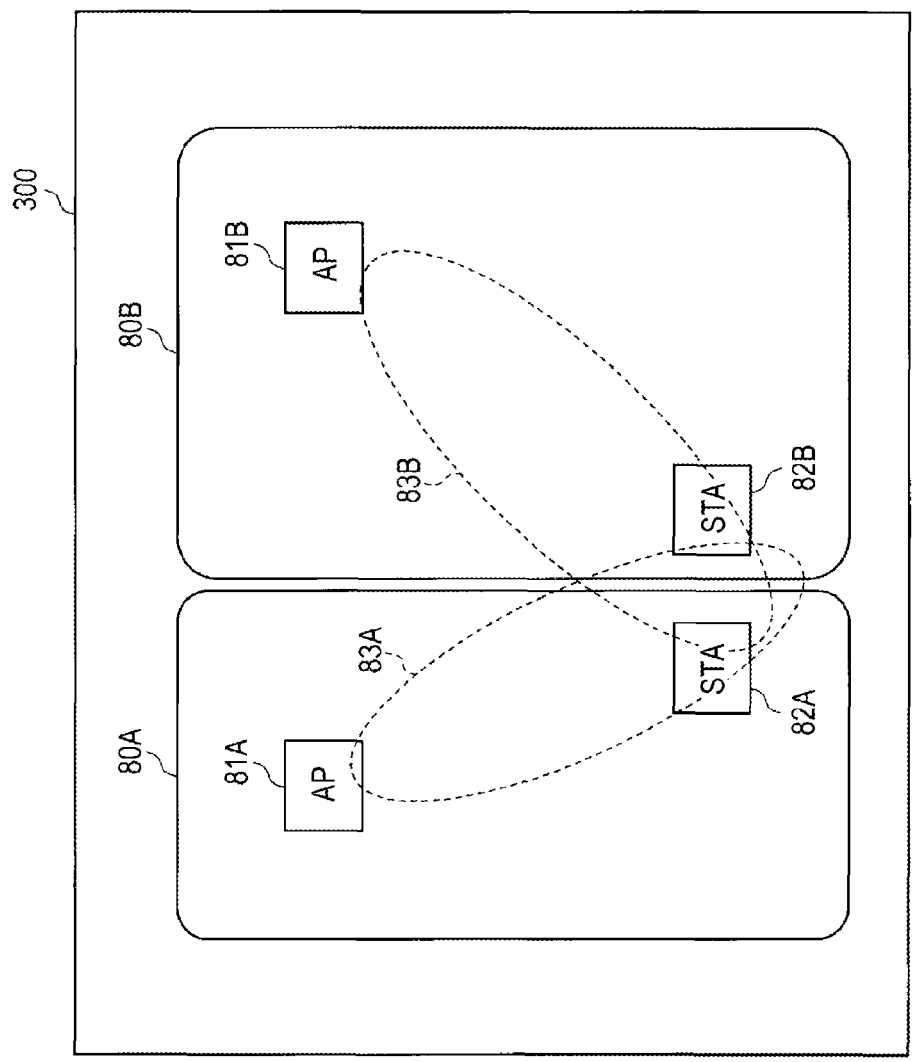
FIG. 1 illustrates a specific example where communication areas of multiple wireless communication networks overlap.

FIG. 1 is a diagram illustrating a specific example where communication areas of multiple wireless communication networks overlap each other. FIG. 1 shows a communication system 300 in which two networks, a wireless communication network 80A and a wireless communication network 80B, adjacently exist. Here, the communication system 300 conforms to the IEEE 802.11ad standard for millimeter-wave communications, and the wireless communication networks 80A and 80B employ the same access control method (for example, carrier sense multiple access with collision avoidance (CSMA/CA)).

The wireless communication network 80A shown in FIG. 1 is managed by an AP 81A, and an STA 82A is connected to the AP 81A. Similarly, the wireless communication network 80B is managed by an AP 81B, and an STA 82B is connected to the AP 81B. In the wireless communication network 80A, the AP 81A and the STA 82A perform beamforming training to select a beam pattern with the best communication quality. Similarly, in the wireless communication network 80B, the AP 81B and the STA 82B perform beamforming training to select a beam pattern with the best communication quality.

FIG. 1 shows a communication area 83A as a communication area of the beam pattern selected through the beamforming training performed by the AP 81A and the STA 82A, and also shows a communication area 83B as a communication area of the beam pattern selected through the beamforming training performed by the AP 81B and the STA 82B.

In a case where the STA 82A and the STA 82B are close to each other, the communication area 83A and the communication area 83B partially overlap each other as shown in FIG. 1. When communications are performed in the wireless communication network 80A and in the wireless communication network 80B at the same time, interference, such as co-channel interference or adjacent channel interference, occurs, lowering communication quality (system throughput). Dynamic frequency selection (DFS) is a common technique to decrease the co-channel or adjacent channel interference. However, since the communication system 300 conforming to IEEE 802.11ad has a small number of usable channels, it is difficult to decrease the interference by using DFS.

Thus, in an environment where multiple wireless communication networks adjacently exist, a beam pattern in each wireless communication network needs to be selected considering not only the communication quality, but also the influence (interference) from another wireless communication network.

To do so, the AP needs to know communication quality information on all beam patterns. In Non-patent Literature 1, however, a transmitter device cannot know reception results of all training frames received by a communication partner, which makes it difficult for the transmitter device to select a beam pattern.

In the technique disclosed by Patent Literature 1 described earlier feeds back reception results of training frames to the transmitter device, but increases the training frames in length because the reception results are included in the training frames. This decreases communication efficiency.

In view of such circumstances, one non-limiting and exemplary embodiment provides a communication system, a method for controlling the communication system, a base station device, and a terminal device, with which beamforming training can be performed without increasing the length of training frames and decreasing communication efficiency even in an environment where multiple wireless communication networks adjacently exist.

[Embodiment]

<Configuration Example Of The Communication System>

Figure 2:
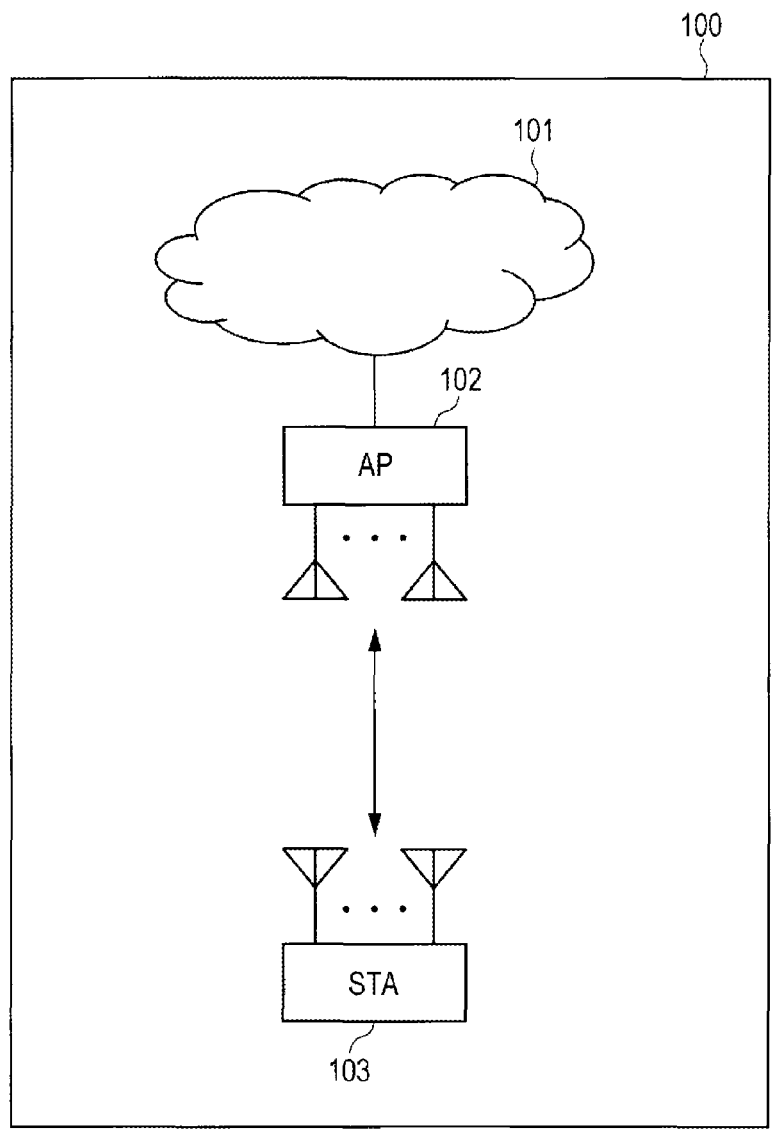
FIG. 2 shows an example of a communication system according to an embodiment of the present disclosure.

FIG. 2 shows an example of a communication system according to an embodiment of the present disclosure. A communication system 100 shown in FIG. 2 includes a communication network 101 such as the Internet, a wireless communication device 102 connected to the communication network 101, and a wireless communication device 103 connected to the communication network 101 through wireless communication with the wireless communication device 102. The wireless communication device 102 and the wireless communication device 103 have the same configuration, and execute different processing depending on whether they operate as a base station device (access point (AP)) or a wireless terminal device (station (STA)).

In the embodiment of the present disclosure described below, the wireless communication device 102 operates as an access point for the wireless communication device 103 and manages access of the wireless communication device 103 to the communication network 101 by transferring data between the wireless communication device 103 and the communication network 101. The wireless communication device 102 and the wireless communication device 103 are communication devices that support the IEEE 802.11ad standard for millimeter-wave communications.

<Configuration Example Of The Wireless Communication Device>

Figure 3:
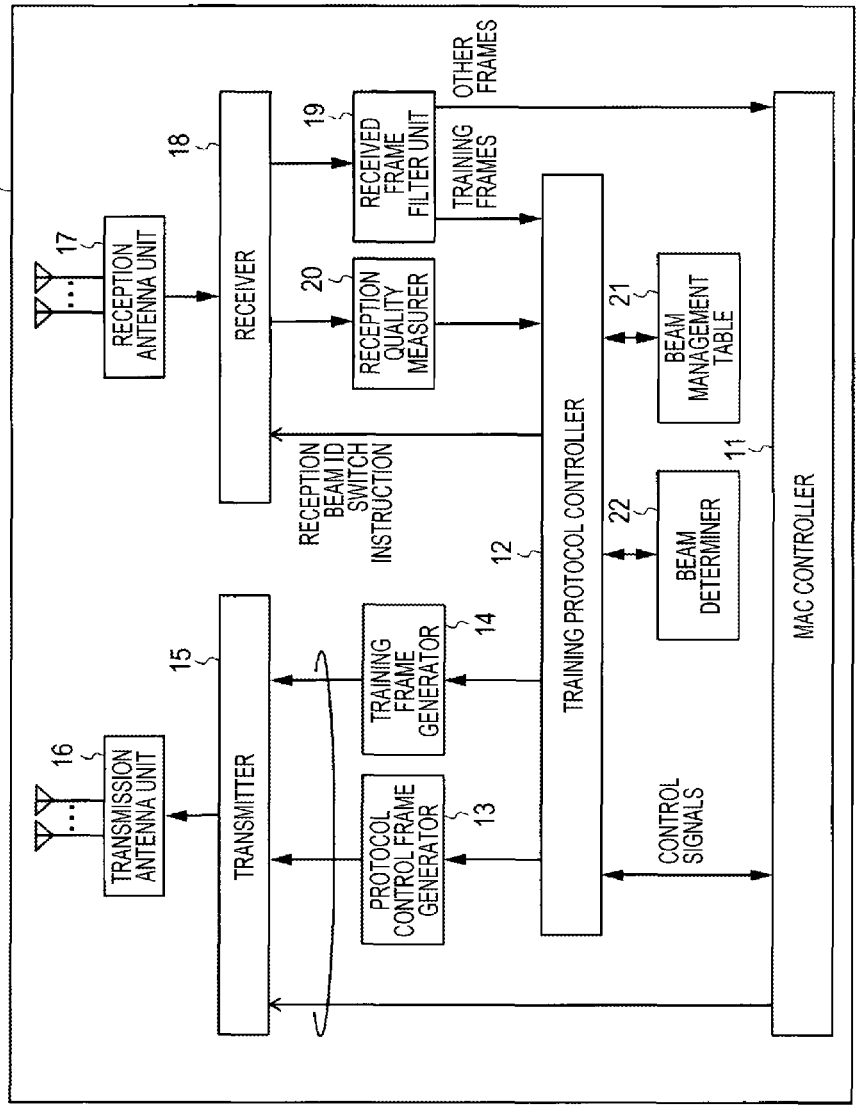
FIG. 3 shows an example of the configuration of a wireless communication device.

Next, an example of the configuration of the wireless communication device 102 (103) is described with reference to FIG. 3. As shown in FIG. 3, the wireless communication device 102 (103) includes a MAC controller 11, a training protocol controller 12, a protocol control frame generator 13, a training frame generator 14, a transmitter 15, a transmission antenna unit 16, a reception antenna unit 17, a receiver 18, a received frame filter unit 19, a received signal quality measurer 20, a beam management table 21, and a beam determiner 22.

The wireless communication device 102 (103) also has, for example, a central processing unit (CPU), a recording medium such as a read-only memory (ROM) in which control programs are stored, and a working memory such as a random-access memory (RAM), although they are not shown in FIG. 3. The functional blocks shown in FIG. 3 are implemented when the CPU executes the control programs.

The MAC controller 11 performs access control for data exchange. More specifically, when there is a data frame to transmit, the MAC controller 11 outputs a media access control (MAC) frame to the transmitter 15, the MAC frame containing a beam ID and a modulation and coding scheme (MCS). The beam ID is index information on a beam pattern used to transmit the data frame, and the MCS is indexed information on a combination of a modulation scheme and a code rate used for the transmission and the like. A MAC frame contains information on a destination address and the like. When wireless communication device 102 (103) receives data, the MAC controller 11 acquires a data frame or a training protocol control frame from the received frame filter unit 19 and performs processing such as outputting the data to a higher-level application or performing protocol control regarding connection or the like.

To connect with another wireless communication device, the wireless communication device 102 (103) first performs beamforming training to determine a beam pattern to use for the connection. In the wireless communication device (AP (base station device)) 102 that initiates the beamforming training protocol, the MAC controller 11 outputs a beamforming training initiation request to the training protocol controller 12. In the wireless communication device (STA (wireless terminal device)) 103 that has received a training frame, the MAC controller 11 outputs a control signal to the training protocol controller 12 based on a training protocol control frame acquired from the received frame filter unit 19. A training frame is a frame containing information necessary for beamforming.

The training protocol controller 12 controls processing related to beamforming training. Specifically, based on a beamforming training initiation request from the MAC controller 11, the training protocol controller 12 outputs a protocol control frame generation request to the protocol control frame generator 13 and outputs a training frame generation request to the training frame generator 14. The training protocol controller 12 outputs a reception beam ID switch instruction to the receiver 18 to switch a reception beam pattern to use to receive a frame from another wireless communication device.

When data is received from another wireless communication device, the training protocol controller 12 outputs, to the beam management table 21, received signal quality information acquired from the received signal quality measurer 20. In addition, the training protocol controller 12 determines based on a training frame acquired from the received frame filter unit 19 whether to generate a protocol control frame, generate a training frame, or output the beam ID within the training frame to the beam management table 21.

The protocol control frame generator 13 generates a protocol control frame based on a protocol control frame generation request from the training protocol controller 12, and outputs the protocol control frame along with a beam ID to the transmitter 15.

The training frame generator 14 generates a training frame based on a training frame generation request from the training protocol controller 12, and outputs the training frame to the transmitter 15 with a beam ID included in the training frame.

The transmitter 15 modulates MAC frames acquired from the MAC controller 11, the protocol control frame generator 13, and the training frame generator 14 based on the MCS acquired, and outputs modulated transmission signals and the acquired beam ID to the transmission antenna unit 16.

The transmission antenna unit 16 has an array antenna including multiple antenna elements, and transmits, to space, transmission signals inputted from the transmitter 15. The transmission antenna unit 16 forms multiple beam patterns by, for example, controlling the phase and/or amplitude of each antenna element based on information such as the beam ID inputted from the transmitter 15, and transmits a transmission signal using the beam pattern thus formed.

The reception antenna unit 17, which has an array antenna including multiple antenna elements, receives signals transmitted from another wireless communication device and outputs them to the receiver 18 as reception signals. The reception antenna unit 17 forms multiple beam patterns by, for example, controlling the phase and/or amplitude of each antenna element, and receives a transmitted signal using the beam pattern thus formed.

The receiver 18 demodulates reception signals acquired from the reception antenna unit 17, and outputs data obtained by the demodulation (a received frame) to the received frame filter unit 19. In addition, during beamforming training, the receiver 18 controls the array antenna of the reception antenna unit 17 based on a reception beam ID inputted from the training protocol controller 12 and switches a beam pattern to one corresponding to the reception beam ID inputted.

The received frame filter unit 19 analyzes the MAC header of the received frame inputted from the receiver 18 to determine the frame type of the received frame. When it is determined as a result of the analysis that the received frame is a training frame, the received frame filter unit 19 outputs the received frame to the training protocol controller 12. When the received frame is a frame other than a training frame, the received frame filter unit 19 outputs the received frame to the MAC controller 11.

The received signal quality measurer 20 measures the received signal quality of a reception signal based on a result of the demodulation the receiver 18 performs on the reception signal, and generates received signal quality information. The received signal quality measurer 20 may measure the received signal quality based on one or a combination of received signal strength indicator (RSSI), signal to noise ratio (SNR), signal-to-interference plus noise power ratio (SINR), bit error rate (BER), packet error rate (PER), frame error rate (FER), and the like. The received signal quality measurer 20 outputs the thus-generated received signal quality information to the training protocol controller 12.

The beam management table 21 manages associations between transmission beam IDs corresponding to beam patterns used to transmit data to a partner wireless communication device and reception beam IDs corresponding to beam patterns used to receive data. The beam management table 21 also manages associations between beam IDs and received signal quality information acquired from the received signal quality measurer 20.

The beam determiner 22 acquires information on training results from the training protocol controller 12, selects a beam pattern to use, and notifies the training protocol controller 12 of the ID of the selected beam pattern.

Figure 4:
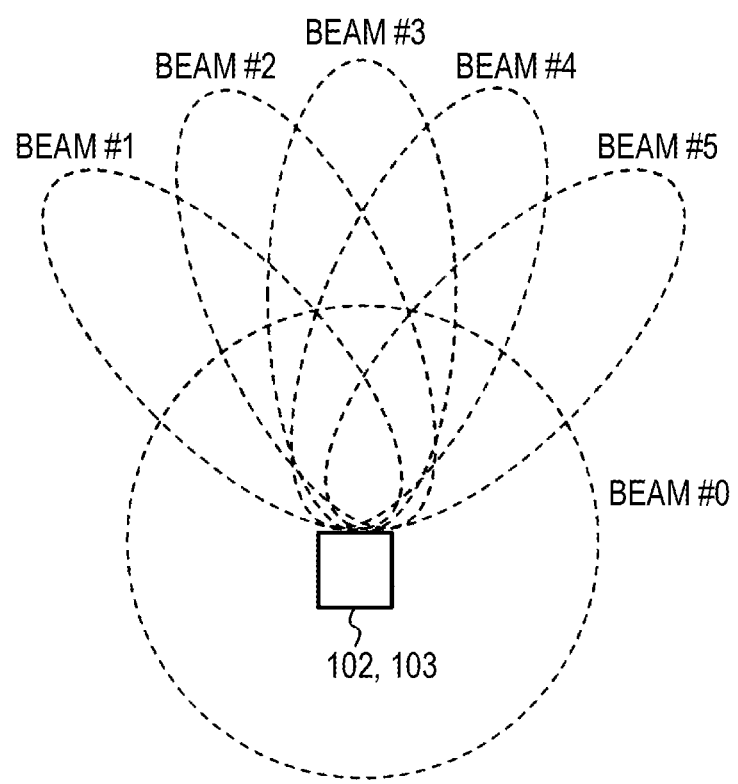
FIG. 4 shows an example of beam patterns formed by the wireless communication device.

Next, a description is given with reference to FIG. 4 of beam patterns formed by the wireless communication device 102 (103). FIG. 4 shows example beam patterns formed by the wireless communication device 102 (103).

FIG. 4 shows a case where the wireless communication device 102 (103) has six beam patterns. The wireless communication device 102 (103) performs communications using one of these six beam patterns which is formed by the array antenna of the transmission antenna unit 16. As shown in FIG. 4, the six beam patterns of the wireless communication device 102 (103) all have different beam directions, including highly directional beam patterns and an omnidirectional beam pattern. Note that the omnidirectional beam pattern is used for protocol control and is not used for data communications. In the example of FIG. 4, beams #1 to #5 are highly directional beam patterns and a beam #0 is an omnidirectional beam pattern.

This example illustrates beam patterns formed by the transmission antenna unit 16, but the same applies to beam patterns formed by the reception antenna unit 17.

Next, a description is given of beam IDs corresponding to each beam pattern. FIG. 5 shows associations among beam patterns, transmission and reception beam IDs for the AP, and transmission and reception beam IDs for the STA. In the following, the wireless communication device 102 (103) operating as an AP is denoted as an AP, and the wireless communication device 102 (103) operating as a STA is denoted as an STA.

In FIG. 5, the "Transmission Beam ID" and "Reception Beam ID" fields under "AP" respectively show transmission beam IDs and reception beam IDs for the wireless communication device 102 operating as an AP, the transmission and reception IDs corresponding to the respective beam patterns.

Similarly, in FIG. 5, the "Transmission Beam ID" and "Reception Beam ID" fields under "STA" respectively show transmission beam IDs and reception beam IDs for the wireless communication device 103 operating as an STA, the transmission and reception IDs corresponding to the respective beam patterns.

<Beamforming Protocol Control>

The following describes an example of operation performed by the wireless communication device 102 (103) when beamforming protocol control is performed in the communication system 100 shown in FIG. 2.

Figure 6:
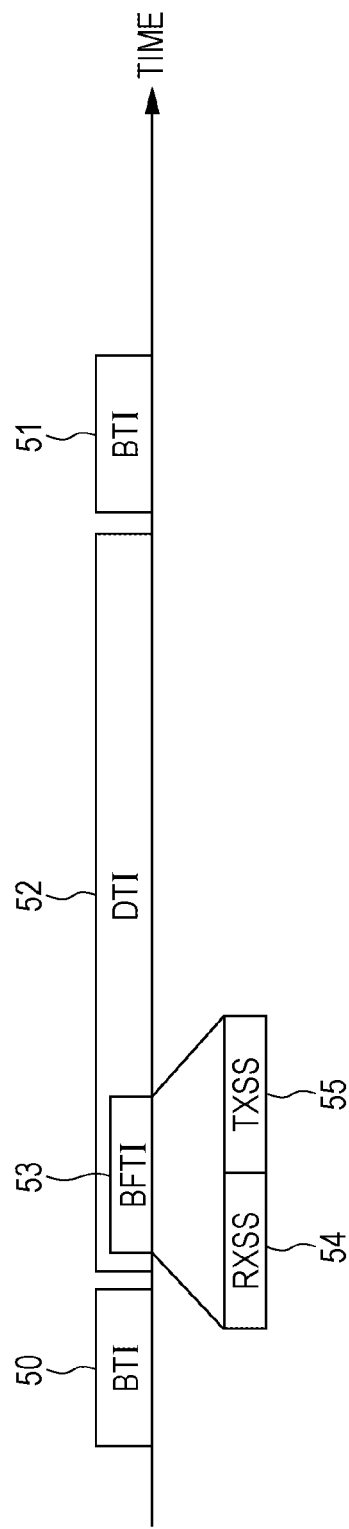
FIG. 6 shows an example of beamforming protocol control.

FIG. 6 is a sequence diagram showing an example of beamforming protocol control in the communication system 100. The sequence (scheduling) shown in FIG. 6 is controlled by the AP that manages communications (connections) in the communication system 100.

As shown in FIG. 6, the AP transmits beacons during a beacon transmission interval (BTI) 50, which is a period for transmitting beacons. The AP sets the BTI periodically. More specifically, as shown in FIG. 6, the AP sets the next BTI 51 when a predetermined period of time passes after the BTI 50 ends. FIG. 6 shows two BTIs, the BTI 50 and the BTI 51, but the BTI is repeatedly set every predetermined period of time until the AP completes operation.

A data transmission interval (DTI) 52, which is a period for transmitting data frames, is set between the BTI 50 and the BTI 51. During the DTI 52, the AP and the STA exchange data. The BTI and DTI are defined in IEEE 802.11ad.

The AP sets a period for performing beamforming training within the DTI 52. In the embodiment of the present disclosure, the period for performing beamforming training is referred to as a beamforming training interval (BFTI) 53.

As shown in FIG. 6, the AP sets a receive sector sweep (RXSS) 54 (reception beamforming training period) and a transmit sector sweep (TXSS) 55 (transmission beamforming training period) within the BFTI 53. The RXSS 54 is a period for sweeping beams to test the communication quality of receive sectors, and the TXSS 55 is a period for sweeping beams to test the communication quality of transmit sectors.

<Operation during the RXSS (Reception Beamforming Training Period)>

Figure 7:
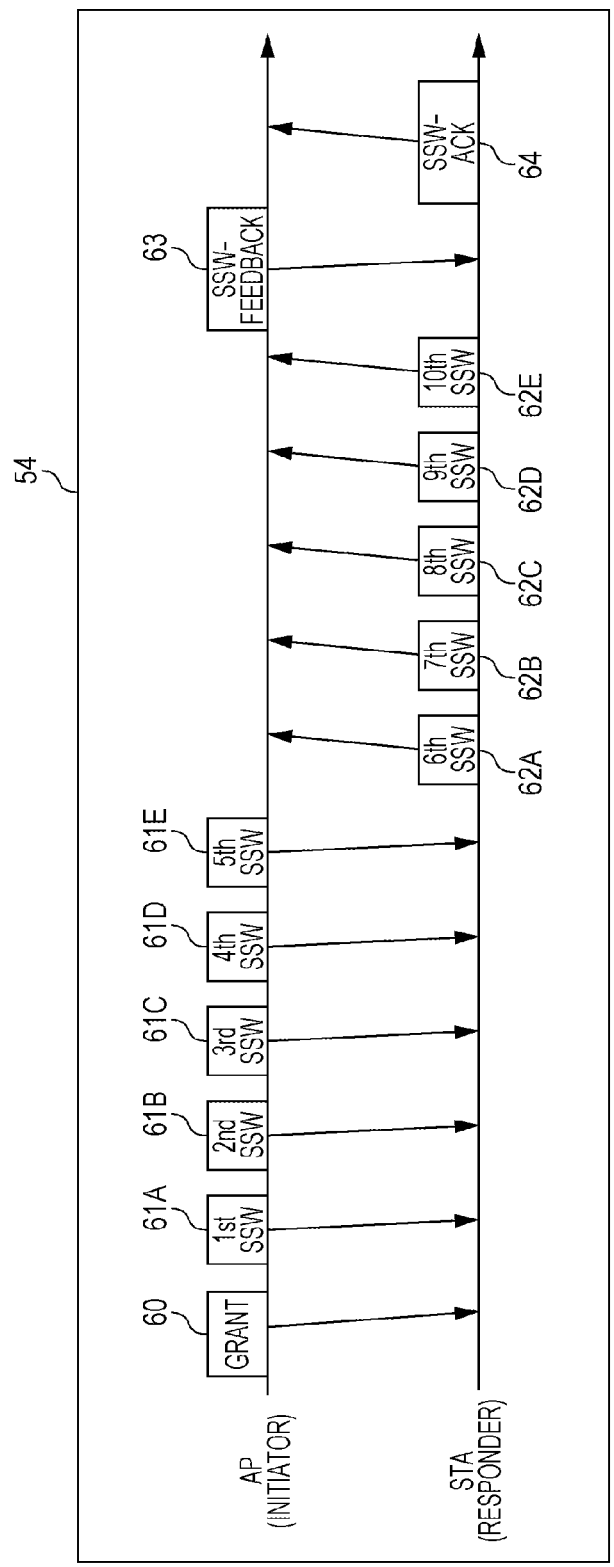
FIG. 7 shows an example of operations of the AP and the STA in an RXSS.

FIG. 7 is a sequence diagram showing an example of operations performed by the AP and the STA during the RXSS 54. As shown in FIG. 7, during the RXSS 54, the AP first transmits a Grant frame 60 (a first protocol control frame) to the STA.

Figure 8:
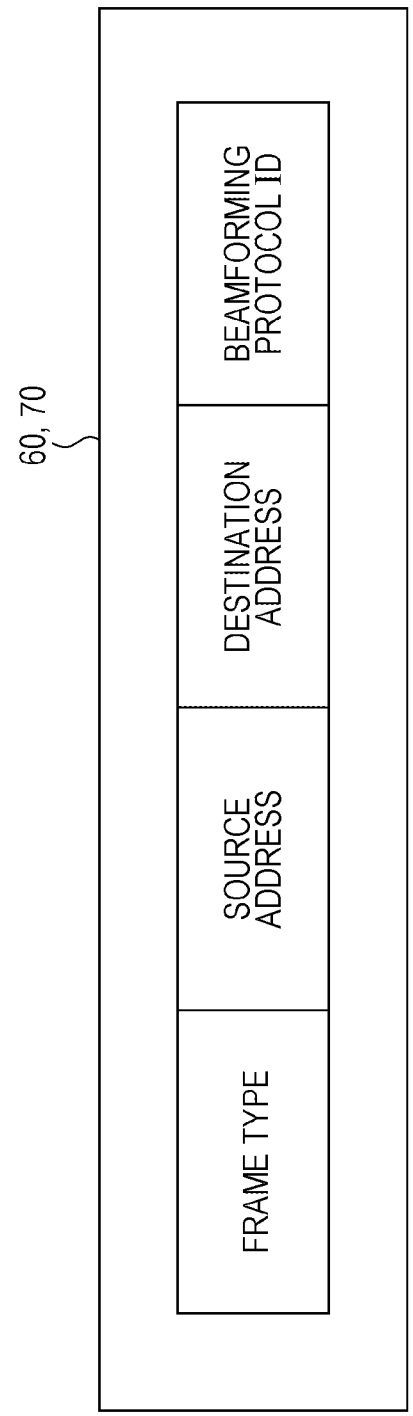
FIG. 8 shows an example of the format of a Grant frame (a first protocol control frame)

FIG. 8 is a diagram showing an example of the format of a Grant frame. The format of a Grant frame is defined in IEEE 802.11ad. As shown in FIG. 8, a Grant frame contains an identifier (a beamforming protocol ID) indicating that a beamforming protocol according to the embodiment of the present disclosure starts.

In FIG. 7, after transmitting the Grant frame 60, the AP transmits a first sector sweep (SSW) frame 61A to a fifth SSW frame 61E to the STA using an omnidirectional beam.

Figure 9:
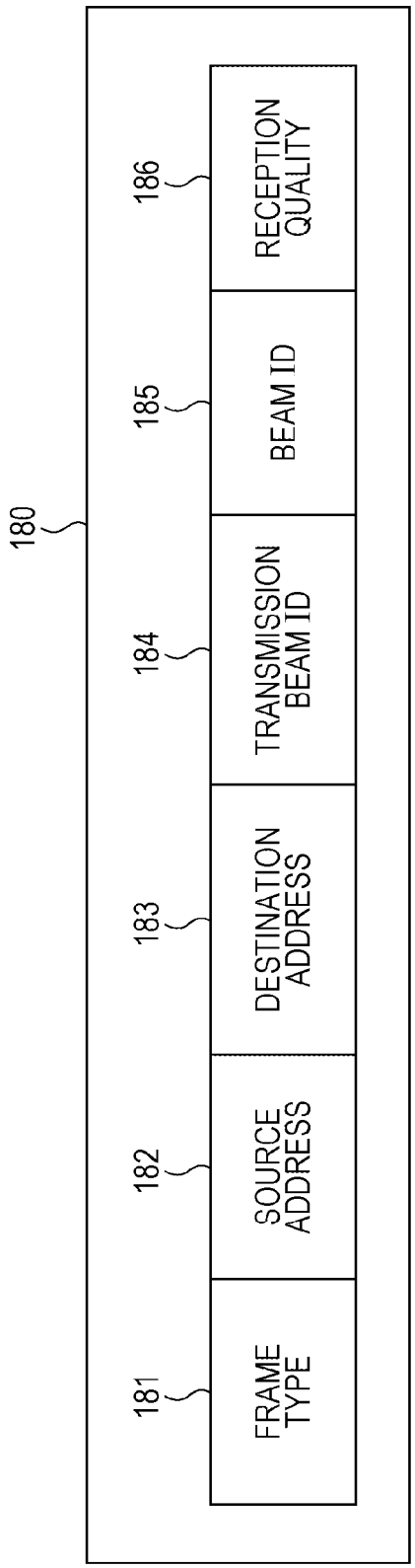
FIG. 9 shows an example of the format of an SSW frame.

FIG. 9 shows an example of the format of an SSW frame. The format of an SSW frame is defined in IEEE 802.11ad. As shown in FIG. 9, an SSW frame 180 contains a transmission beam ID 184, which is the ID of a beam used to transmit the SSW frame to a destination address 183, as well as a beam ID 185 and a received signal quality 186 which are fields used to feed back the received signal quality of a beam measured.

In FIG. 7, the AP transmits the first to fifth SSW frames 61A to 61E each having an omnidirectional beam ID #itx0 stored in the transmission beam ID 184. Note that the AP does not store any information in the beam ID 185 and the received signal quality 186 in the first to fifth SSW frames 61A to 61E.

The first to fifth SSW frames 61A to 61E correspond to a plurality of first training frames in the present disclosure.

FIG. 7 shows an example where the AP transmits five SSW frames (the first to fifth SSW frames). The number of SSW frames corresponds to the number of directional beams formed by the wireless communication device 102 (103). In other words, since the wireless communication device 102 (103) according to the embodiment of the present disclosure can use five directional beam patterns as shown in FIG. 4, five SSW frames are transmitted in FIG. 7. Each SSW frame contains the ID of a beam used for transmission.

The STA receives the first to fifth SSW frames 61A to 61E transmitted by the AP while the STA switches among beam patterns for the respective frames. When receiving the first to fifth SSW frames 61A to 61E, the STA measures the received signal quality of each of the beams used for the receptions. The STA then ranks the beams according to the levels of the received signal quality.

FIG. 10 shows an example of the IDs of beams used by the STA to receive the first to fifth SSW frames 61A to 61E and measurement results of the received signal quality of the beams. More specifically, FIG. 10 shows the IDs of beams used to receive the respective SSW frames, SNRs as an example of information on the received signal quality of the beams used to receive the SSW frames, and received signal quality ranks of the beams used for the reception with a beam with the highest received signal quality being ranked first. The SNR shown in FIG. 10 is an index value converted from a dB value.

In FIG. 10, the fourth SSW frame (the beam ID: #rrx4) has the highest received signal quality measured, which is followed by the second SSW frame (#rrx2), the third SSW frame (#rrx3), the first SSW frame (#rrx1), and the fifth SSW frame (#rrx5) in this order. The STA associates the IDs of the beams used for the receptions, the received signal quality information on the beams, and the ranks of the beams with one another, and stores these associations in the beam management table 21.

The received signal quality ranks of the beams used by the STA to receive the first to fifth SSW frames 61A to 61E are used in the TXSS 55 following the RXSS 54. Operations of the AP and the STA during the TXSS 55 will be described later.

In FIG. 7, after receiving all of the first to fifth SSW frames 61A to 61E, the STA transmits sixth to tenth SSW frames 62A to 62E to the AP using the omnidirectional beam. In FIG. 7, the STA transmits the sixth to tenth SSW frames 62A to 62E each having an omnidirectional beam ID #irx0 stored in the transmission beam ID 184. Note that the STA does not store any information in the beam ID 185 and the received signal quality 186 in the sixth to tenth SSW frames 62A to 62E. The AP receives the sixth to tenth SSW frames 62A to 62E transmitted by the STA while the AP switches among beam patterns for the respective frames. The sixth to tenth SSW frames 62A to 62E correspond to a plurality of second training frames in the present disclosure.

FIG. 11 shows an example of beam patterns used by each of the AP and the STA during the RXSS, which is a period for transmitting and receiving the first to tenth SSW frames shown in FIG. 7. In FIG. 11, the AP transmits the Grant frame 60 and the first to fifth SSW frames 61A to 61E using the omnidirectional beam pattern (the beam #0 shown in FIG. 4), while the STA receives the first to fifth SSW frames 61A to 61E using beam patterns in different directions for the respective SSW frames.

More specifically, in FIG. 11, the STA receives the first SSW frame 61A using a beam #rrx1(see FIG. 5) corresponding to the beam pattern #1. The STA receives the second SSW frame 61B using a beam #rrx2 corresponding to the beam pattern #2. The STA receives the third SSW frame 61C using a beam #rrx3 corresponding to the beam pattern #3. The STA receives the fourth SSW frame 61D using a beam #rrx4 corresponding to the beam pattern #4. The STA receives the fifth SSW frame 61E using a beam #rrx5 corresponding to the beam pattern #5.

Then, the STA transmits the sixth to tenth SSW frames 62A to 62E using the beam #rtx0 corresponding to the omnidirectional beam #0. The AP then receives the sixth to tenth SSW frames 62A to 62E using beam patterns in different directions for the respective SSW frames. More specifically, in FIG. 11, the AP receives the sixth SSW frame 62A using a beam #irx1 (see FIG. 5) corresponding to the beam pattern #1. The AP receives the seventh SSW frame 62B using a beam #irx2 corresponding to the beam pattern #2. The AP receives the eighth SSW frame 62C using a beam #irx3 corresponding to the beam pattern #3. The AP receives the ninth SSW frame 62D using a beam #irx4 corresponding to the beam pattern #4. The AP receives the tenth SSW frame 62E using a beam #irx5 corresponding to the beam pattern #5.

Referring back to FIG. 7, upon receipt of the sixth to tenth SSW frames 62A to 62E transmitted by the STA, the AP transmits an SSW-Feedback frame 63 (a second protocol control frame) to the STA. Upon receipt of the SSW-Feedback frame 63, the STA transmits an SSW-ACK frame 64 (a third protocol control frame) to the AP.

Figure 12:
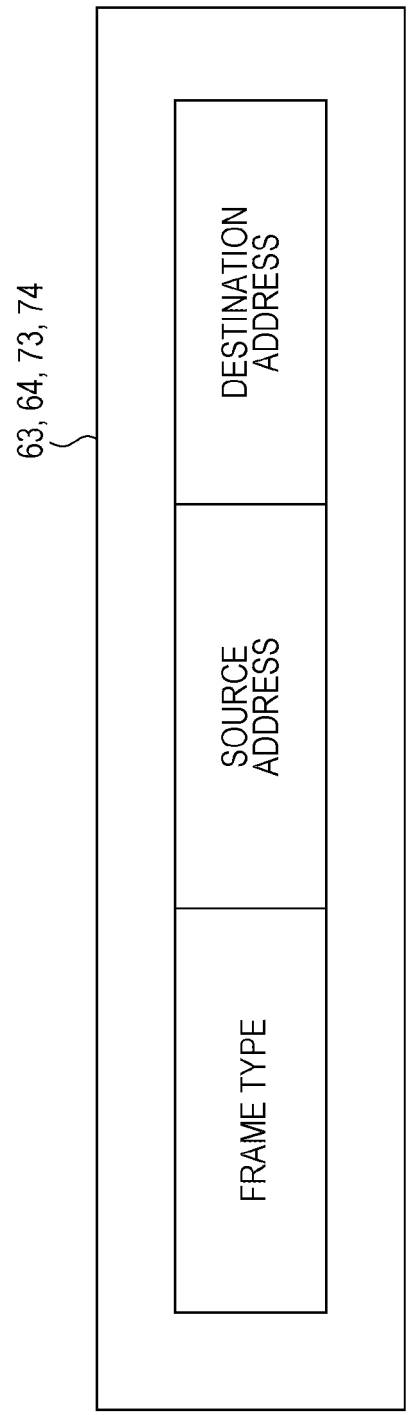
FIG. 12 shows an example of the format of an SSW-Feedback frame (a second protocol control frame) and an SSW-ACK frame (a third protocol control frame)

FIG. 12 shows an example of the format of the SSW-Feedback frame 63 (the second protocol control frame) and the SSW-ACK frame 64 (the third protocol control frame). In FIG. 12, the SSW-Feedback frame 63 (or the SSW-ACK frame 64) contains information such as a frame type, a source address, and a destination address. A frame type is an identifier or a pattern indicating that the frame is the second (or third) protocol control frame. The source address is the identifier (such as a MAC address) of a device transmitting the second (or third) protocol control frame. The destination address is the identifier (such as a MAC address) of a device receiving the second (or third) protocol control frame.

<Operation During the TXSS (Transmission Beamforming Training Period)>

In the communication system 100 according to the embodiment of the present disclosure, after the RXSS ends, the TXSS starts. The following describes an example of operations performed by the AP and the STA during the TXSS 55.

Figure 13:
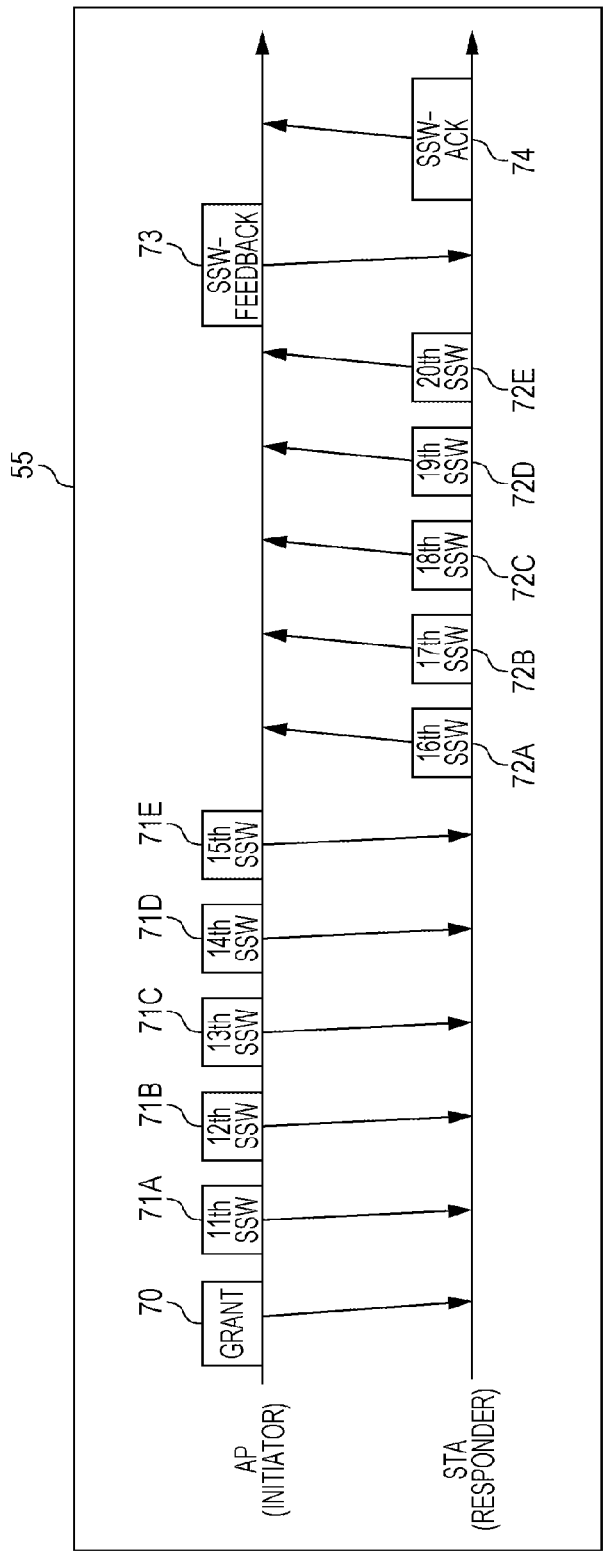
FIG. 13 shows an example of operations of the AP and the STA in a TXSS.

FIG. 13 is a sequence diagram showing an example of operations performed by the AP and the STA during the TXSS 55. In the TXSS 55, the AP first transmits a Grant frame 70 (a fourth protocol control frame) to the STA. Like the Grant frame 60 shown in FIG. 8, the Grant frame 70 contains an identifier (a beamforming protocol ID) indicating that a beamforming protocol according to the embodiment of the present disclosure starts.

In FIG. 13, after transmitting the Grant frame 70, the AP transmits 11th to 15th SSW frames 71A to 71E to the STA while switching among beam patterns for the respective frames. The 11th to 15th SSW frames 71A to 71E each contain the ID of a beam used for its transmission.

Specifically, the ID of a beam used for transmission is written in the transmission beam ID 184 field of an SSW frame, shown in FIG. 9. For example, the AP stores #itx1 in the transmission beam ID 184 of the 11th SSW frame 71A, #itx2 in the transmission beam ID 184 of the 12th SSW frame 71B, #itx3 in the transmission beam ID 184 of the 13th SSW frame 71C, #itx4 in the transmission beam ID 184 of the 14th SSW frame 71D, and #itx5 in the transmission beam ID 184 of the 15th SSW frame 71E.

Note that the AP does not store any information in the beam ID 185 and the received signal quality 186 of the 11th to 15th SSW frames 71A to 71E. The 11th to 15th SSW frames 71A to 71E correspond to a plurality of third training frames in the present disclosure.

FIG. 14 shows an example of beam patterns used by each of the AP and the STA during the TXSS, which is a period for transmitting and receiving the 11th to 20th SSW frames shown in FIG. 13. In FIG. 14, the AP transmits the Grant frame 70 using the omnidirectional beam pattern, and transmits the 11th to 15th SSW frames 71A to 71E using beam patterns in different directions for the respective SSW frames. The STA receives the Grant frame 70 and the 11th to 15th SSW frames 71A to 71E using the beam #rrx0 corresponding to the omnidirectional beam pattern (the beam #0 shown in FIG. 4).

Specifically the AP transmits the Grant frame 70 using the beam #itx0 (see FIG. 5) corresponding to the omnidirectional beam pattern #0. The AP transmits the 11th SSW frame 71A using the beam #itx1 corresponding to the beam pattern #1, the 12th SSW frame 71B using the beam #itx2 corresponding to the beam pattern #2, the 13th SSW frame 71C using the beam #itx3 corresponding to the beam pattern #3, the 14th SSW frame 71D using the beam #itx4 corresponding to the beam pattern #4, and the 15th SSW frame 71E using the beam #itx5 corresponding to the beam pattern #5.

The STA, on the other hand, transmits 16th to 20th SSW frames 72A to 72E using beam patterns in different directions for the respective SSW frames. The AP then receives the 16th to 20th SSW frames 72A to 72E using the beam #irx0 corresponding to the omnidirectional beam pattern #0.

Specifically, the STA transmits the 16th SSW frame 72A using the beam #rtx1 corresponding to the beam pattern #1, the 17th SSW frame 72B using the beam #rtx2 corresponding to the beam pattern #2, the 18th SSW frame 72C using the beam #rtx3 corresponding to the beam pattern #3, the 19th SSW frame 72D using the beam #rtx4 corresponding to the beam pattern #4, and the 20th SSW frame 72E using the beam #rtx5 corresponding to the beam pattern #5.

Using the omnidirectional beam #0, the STA receives the 11th to 15th SSW frames 71A to 71E transmitted by the AP. Upon receipt of the 11th to 15th SSW frames 71A to 71E, the STA measures the received signal quality of the beams used for the frames and ranks the beams according to the levels of the received signal quality.

FIG. 15 shows an example of measurement results of the received signal quality of the 11th to 15th SSW frames 71A to 71E received by the STA. FIG. 15 shows an example of the beam IDs included in the respective SSW frames received by the STA (i.e., the IDs of beams used by the AP for the transmissions), SNRs as an example of information on received signal quality of the beams measured upon receipt of the SSW frames, and ranks of the beams with a beam with the highest received signal quality being ranked first. In FIG. 15, the 14th SSW frame (beam ID #itx4) has the highest received signal quality measured, which is followed by the 12th SSW frame (#itx2), the 13th SSW frame (#itx3), the 15th SSW frame (#itx5), and the 11th SSW frame (#itx1) in this order.

To sum up, in FIG. 15, the beam itx4 has the highest received signal quality and the beam #itx1 has the lowest received signal quality among the transmission beam patterns used by the AP to transmit the 11th to 15th SSW frames 71A to 71E to the STA. The STA stores associations between beam IDs corresponding to the beam patterns used by the AP for the transmissions of the respective SSW frames and the ranks of the beams determined according to their received signal quality.

Referring back to FIG. 13, after receiving the 11th to 15th SSW frames 71A to 71E, the STA transmits the 16th to 20th SSW frames 72A to 72E to the AP while switching among beam patterns for the respective frames. Based on the ranks determined upon reception of the first to fifth SSW frames 61A to 61E, the STA transmits the 16th to 20th SSW frames 72A to 72E respectively having stored therein the IDs of beams used to transmit the 16th to 20th SSW frames 72A to 72E, the beam IDs according to the ranks determined upon reception of the 11th to 15th SSW frames 71A to 71E, and the information on the received signal quality of the 11th to 15th SSW frames 71A to 71E. Note that the 16th to 20th SSW frames 72A to 72E correspond to a plurality of fourth training frames of the present disclosure.

FIG. 16 shows an example of the IDs of beams used by the STA to transmit the 16th to 20th SSW frames 72A to 72E (transmission beam IDs) as well as information to be stored in the SSW frames and transmitted along therewith, namely, the IDs of beams used by the AP to transmit the 11th to 15th SSW frames 71A to 71E and information on received signal quality of these beams. In other words, the STA transmits ranking results obtained in the TXSS shown in FIG. 15, according to the ranking results obtained in the RXSS shown in FIG. 10. For example, since the first to third ranks are common to the RXSS and the TXSS, measurement results on the beam IDs #itx2 to #itx4 are transmitted with the transmission beam IDs #rtx2 to #rtx4, respectively. The measurement result on the beam #itx5 ranking fourth in FIG. 15 is transmitted with the beam #rrx1 which ranks fourth in FIG. 10, and the measurement result on the beam #itx1 ranking fifth in FIG. 15 is transmitted with the beam #rrx5 which ranks fifth in FIG. 10.

In the example shown in FIG. 16, the 16th SSW frame 72A is transmitted by the STA using the transmission beam ID #rtx1. The 16th SSW frame 72A contains the AP's transmission beam ID #itx5 and the SNR value "60" measured upon reception of this beam. More specifically, in the SSW frame format shown in FIG. 9, #rtx1 is stored in the transmission beam ID 184, #itx5 in the beam ID 185, and "60" in the received signal quality 186.

The 17th SSW frame 72B is transmitted by the STA using the transmission beam ID #rtx2. The 17th SSW frame 72B contains the AP's transmission beam ID #itx2 and the SNR value "90" measured upon reception of this beam. More specifically, in the SSW frame format shown in FIG. 9, #rtx2 is stored in the transmission beam ID 184, #itx2 in the beam ID 185, and "90" in the received signal quality 186.

The 18th SSW frame 72C is transmitted by the STA using the transmission beam ID #rtx3. The 18th SSW frame 72C contains the AP's transmission beam ID #itx3 and the SNR value "80" measured upon reception of this beam. More specifically, in the SSW frame format shown in FIG. 9, #rtx3 is stored in the transmission beam ID 184, #itx3 in the beam ID 185, and "80" in the received signal quality 186.

The 19th SSW frame 72D is transmitted by the STA using the transmission beam ID #rtx4. The 19th SSW frame 72D contains the AP's transmission beam ID #itx4 and the SNR value "95" measured upon reception of this beam. More specifically, in the SSW frame format shown in FIG. 9, #rtx4 is stored in the transmission beam ID 184, #itx4 in the beam ID 185, and "95" in the received signal quality 186.

The 20th SSW frame 72E is transmitted by the STA using the transmission beam ID #rtx5. The 20th SSW frame 72E contains the AP's transmission beam ID #itx1 and the SNR value "30" measured upon reception of this beam. More specifically, in the SSW frame format shown in FIG. 9, #rtx5 is stored in the transmission beam ID 184, #itx1 in the beam ID 185, and "30" in the received signal quality 186.

The associations between the ID of beams used by the STA to transmit the 16th to 20th SSW frames 72A to 72E and information included in and transmitted along with the SSW frames, namely the AP's transmission beam IDs and information on received signal quality measured upon reception of the beams, may be determined as follows.

In FIG. 10, in the period when the STA receives the first to fifth SSW frames 61A to 61E, the reception beam pattern #rrx4 has the highest received signal quality. This suggests that high transmission quality may be obtainable in a case where the STA uses the transmission beam pattern #rtx4 for transmissions to the AP. This is because the transmission beam pattern and the reception beam pattern are almost the same.

In FIG. 16, the STA includes #itx4, which is the AP's transmission beam pattern with the highest received signal quality, in the 19th SSW frame 72D transmitted using the transmission beam pattern #rtx4 (see FIG. 15).

In other words, in the SSW frame transmitted by the STA to the AP using a transmission beam pattern presumed to provide the highest transmission quality, the STA includes the AP's transmission beam ID used by the AP to transmit the SSW frame with the highest received signal quality among the SSW frames previously received from the AP.

Similarly, in the SSW frame transmitted by the STA to the AP using a transmission beam pattern presumed to provide the n-th highest transmission quality, the STA includes the AP's transmission beam ID used by the AP to transmit the SSW frame with the n-th highest received signal quality among the SSW frames previously received from the AP. Here, n is a positive integer.

By thus transmitting the 16th to 20th SSW frames, the STA can notify the AP of the best transmission beam pattern for the AP using the best transmission beam pattern. Thereby, should the AP not receive all of the 16th to 20th SSW frames 72A to 72E for example, the AP can appropriately determine a beam pattern to use for transmissions based on information on an AP's transmission beam pattern included in an SSW frame that the AP did receive.

Referring back to FIG. 13, after receiving the 16th to 20th SSW frames 72A to 72E transmitted by the STA, the AP transmits an SSW-Feedback frame 73 (a fifth protocol control frame) to the STA. Upon receipt of the SSW-Feedback frame 73, the STA transmits an SSW-ACK frame 74 (a sixth protocol control frame) to the AP.

The beamforming procedure performed by the wireless communication device 102 (103) has been set forth thus far. As described above, the communication system 100 according to the embodiment of the present disclosure performs the RXSS 54 for determining reception beam patterns and thereafter the TXSS 55 for determining transmission beam patterns. In the RXSS 54, the STA receives, while switching beam patterns, the first to fifth SSW frames 61A to 61E (the first training frames) transmitted by the AP, measures the received signal quality of the beams patterns used for the receptions, and ranks the reception beam patterns according to the received signal quality levels. In the TXSS 55, the STA transmits the 16th to 20th SSW frames 72A to 72E (fourth training frames) in which transmission beam patterns are ranked based on the ranks of the reception beam patterns determined in the RXSS 54. In other words, the STA uses the ranks of the reception beam patterns determined based on the received signal quality of the first training frames, as the ranks of the transmission beam patterns.

Further, in the TXSS 55, when receiving the 11th to 15th training frames (third training frames) from the AP, the STA measures the received signal quality of the beams used to receive the respective third training frames, ranks the beams according to the received signal quality, and includes the ranking results in the fourth training frames to be transmitted.

Such a configuration enables the STA to use a transmission beam pattern presumed to provide the best received signal quality on the AP's end to transmit a fourth training frame containing the beam ID of an AP's transmission beam pattern with the highest received signal quality on the STA's end.

<Operation of the AP>

The following describes an example of how the wireless communication device 102 (103) operates during the beamforming training procedure in the communication system 100 when the wireless communication device 102 (103) acts as an AP.

Figure 17A:
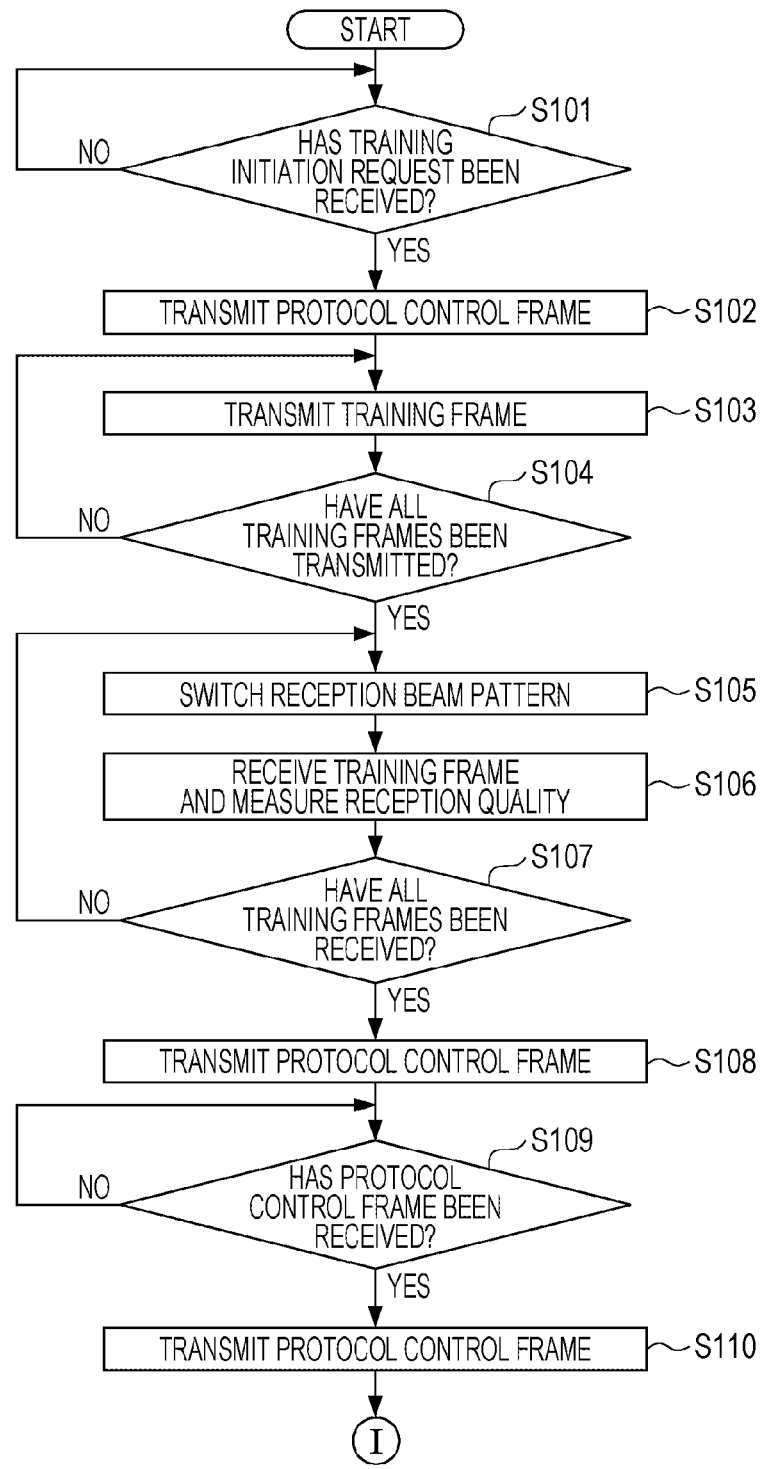
FIGS. 17A and 17B show example of how an AP operates when the AP acts as an initiator.
Figure 17B:
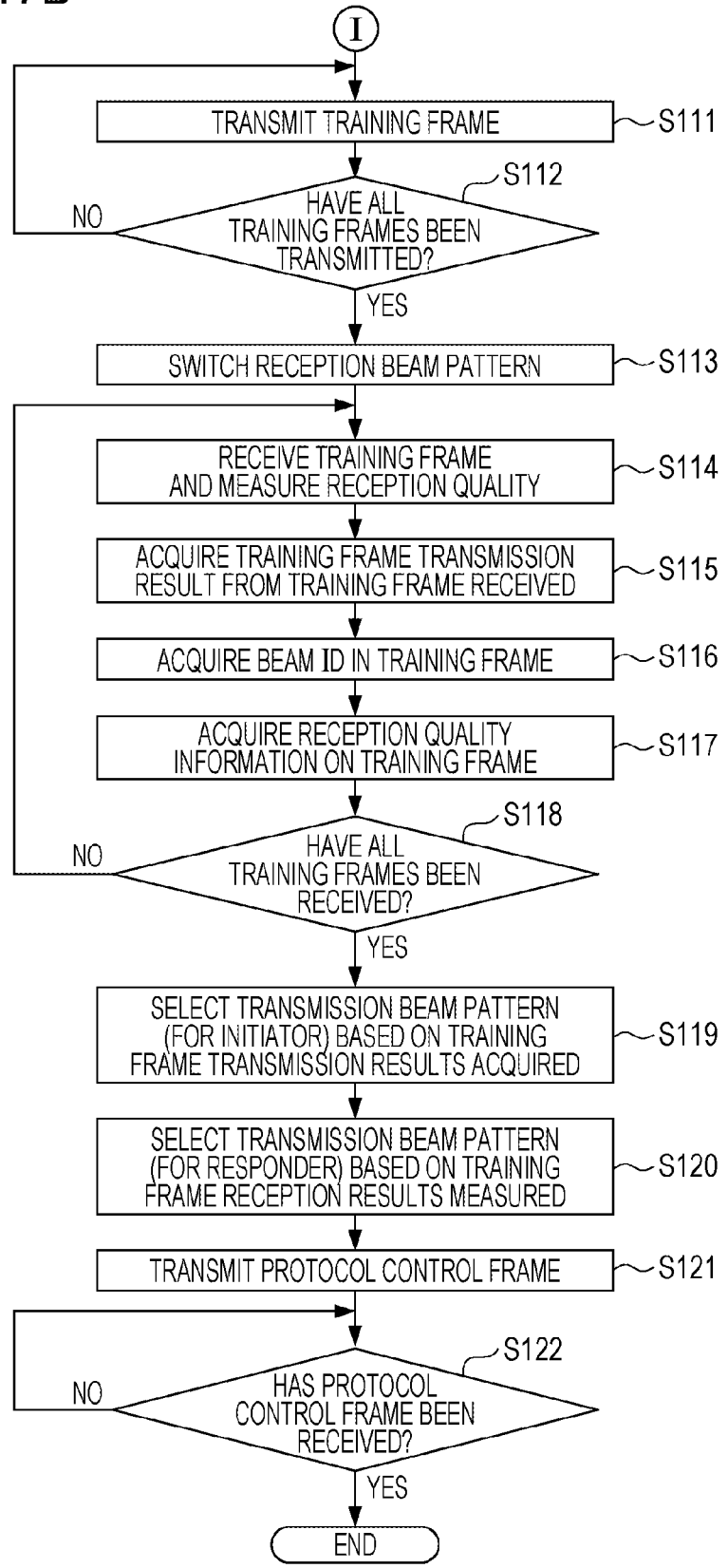

In the following description, the AP is an initiator transmitting a connection request, and the STA is a responder receiving the connection request. FIGS. 17A and 17B are flowchart illustrating an example of how the AP, the initiator, operates.

[Starting Beamforming Training Procedure (Step S101)]

In Step S101, the training protocol controller 12 determines whether a beamforming training initiation request has been inputted from the MAC controller 11. The procedure proceeds to Step S102 when a beamforming training initiation request has been inputted from the MAC controller 11 (S101: YES), or repeats Step S101 when no beamforming training initiation request has been inputted from the MAC controller 11 (S101: NO).

[RXSS (Steps S102 to S109)]

In Step S102, the training protocol controller 12 outputs, to the protocol control frame generator 13, a request for generation of a first protocol control frame to start a training protocol, and the transmitter 15 transmits a first protocol control frame generated by the protocol control frame generator 13 to the STA. As described earlier, the first protocol control frame corresponds to the Grant frame 60 shown in FIG. 7, and contains an identifier (beamforming protocol ID) indicating that the beamforming protocol according to the embodiment of the present disclosure starts.

In Step S103, the training protocol controller 12 outputs a request for generation of first training frames to the training frame generator 14. In response, the training frame generator 14 generates multiple first training frames, and the transmitter 15 transmits each of the thus-generated first training frames to the STA using the omnidirectional beam pattern (the beam #0 shown in FIG. 4).

The first training frames correspond to the first to fifth SSW frames 61A to 61E shown in FIG. 7. The request outputted by the training protocol controller 12 to the training frame generator 14 in Step S103 asks for generation of training frames as many as directional beam patterns of the AP.

In Step S104, the training protocol controller 12 determines whether all the first training frames have been transmitted. The procedure proceeds to Step S105 when it is determined that all the first training frames have been transmitted (S104: YES), or proceeds back to Step S103 otherwise (S104: NO).

In Step S105, the training protocol controller 12 outputs a reception beam switch instruction to the receiver 18 to switch a reception beam pattern for each of second training frames transmitted by the STA that has received the first training frames. The second training frames correspond to the sixth to tenth SSW frames 62A to 62E shown in FIG. 7.

In Step S106, the training protocol controller 12 causes the receiver 18 to receive a second training frame transmitted by the STA using the reception beam pattern switched, and causes the received signal quality measurer 20 to measure the received signal quality of the beam used to receive the second training frame.

In Step S107, the training protocol controller 12 determines whether all the second training frames have been received. The procedure proceeds to Step S108 when it is determined that all the second training frames have been received (S107: YES), or proceeds back to Step S105 otherwise (S107: NO).

In Step S108, the training protocol controller 12 outputs a request for generation of a second protocol control frame to the protocol control frame generator 13, and causes the transmitter 15 to transmit a second protocol control frame generated by the protocol control frame generator 13 to the STA. As described earlier, the second protocol control frame corresponds to the SSW-Feedback frame 63 shown in FIG. 7.

In Step S109, the training protocol controller 12 determines whether a third protocol control frame has been received from the STA. As described earlier, the third protocol control frame corresponds to the SSW-ACK frame 64 shown in FIG. 7. The procedure proceeds to Step S110 when it is determined that the third protocol control frame has been received (S109: YES), or repeats Step S109 otherwise (S109: NO).

[TXSS (Steps S110 to S118)]

In Step S110, the training protocol controller 12 outputs a request for generation of a fourth protocol control frame to the protocol control frame generator 13, and the transmitter 15 transmits a fourth protocol control frame generated by the protocol control frame generator 13 to the STA. As described earlier, the fourth protocol control frame corresponds to the Grant frame 70 shown in FIG. 13, and contains an identifier (a beamforming protocol ID) indicating that the beamforming protocol according to the embodiment of the present disclosure starts.

In Step S111, the training protocol controller 12 outputs a request for generation of third training frames to the training frame generator 14. In response, the training frame generator 14 generates multiple third training frames, and the transmitter 15 transmits each of the thus-generated third training frames to the STA while switching among the transmission beam patterns for the respective frames. The third training frames correspond to the 11th to 15th SSW frames 71A to 71E shown in FIG. 13.

In Step S112, the training protocol controller 12 determines whether all the third training frames have been transmitted. The procedure proceeds to Step S113 when it is determined that all the third training frames have been transmitted (S112: YES), or proceeds back to Step S111 otherwise (S112: NO).

In Step S113, the training protocol controller 12 outputs a reception beam switch instruction to the receiver 18 to switch and use an omnidirectional beam pattern for receptions of fourth training frames transmitted by the STA that has received the third training frames. The fourth training frames correspond to the 16th to 20th SSW frames 72A to 72E shown in FIG. 13.

In Step S114, the training protocol controller 12 causes the receiver 18 to receive a fourth training frame transmitted by the STA using the omnidirectional beam pattern, and causes the received signal quality measurer 20 to measure the received signal quality of the beam used.

In Step S115, the training protocol controller 12 acquires, from the received frame filter unit 19, reception result information contained in the fourth training frame received in Step S114. As described earlier, the reception result information contained in each fourth training frame is related to one of the third training frames (the 11th to 15th SSW frames 71A to 71E) transmitted by the AP, and includes the received signal quality of a beam measured by the STA upon receipt of the third training frame and the rank of the beam determined according to the received signal quality. From the viewpoint of the AP, the reception result information is a transmission result of a training frame. The training protocol controller 12 outputs the thus-acquired reception result information to the beam management table 21 to have the beam management table 21 manage this information.

In Step S116, the training protocol controller 12 acquires, from the received frame filter unit 19, the ID of a beam used by the STA to transmit the fourth training frame received in Step S114 (STA's transmission beam ID).

In Step S117, the training protocol controller 12 acquires information on the received signal quality measured in Step S114 from the received signal quality measurer 20.

In Step S118, the training protocol controller 12 determines whether all the fourth training frames have been received. The procedure proceeds to Step S119 when it is determined that all the fourth training frames have been received (S118: YES), or proceeds back to Step S114 otherwise (S118: NO).

In Step S119, the training protocol controller 12 outputs, to the beam determiner 22, an instruction to determine a beam ID to use for subsequent transmissions to the STA (an AP's transmission beam ID) based on the reception result information acquired in Step S115. A method for determining the AP's transmission beam ID based on the reception result information can be selected according to the environment of the AP of the communication system 100.

For example, when there is another communication system 100 (at a position which may cause interference), the beam determiner 22 may determine that the AP's transmission beam ID is a beam ID with the lowest received signal quality among beam IDs satisfying received signal quality for achieving the communication quality required by an application used (such as throughput and delay time).

In the example shown in FIG. 16, in a case where the received signal quality that can achieve the communication quality required by an application used is SNR=70, #itx3 with the lowest quality among beams with an SNR higher than 70 may be selected. in a case where the received signal quality that can achieve the communication quality required by an application used is SNR=85, #itx2 with the lowest quality among beams with an SNR higher than 85 may be selected.

When there is no other communication system around the communication system 100 (at a position which may cause interference), the beam determiner 22 may determine that the AP's transmission beam ID is a beam ID with the highest received signal quality.

Such beam selection allows the AP's transmission beam ID to be suitably selected even when the AP is in an environment where multiple communication systems adjacently exist to cause much interference.

Referring back to FIG. 17B, in Step S120, the training protocol controller 12 selects an STA's transmission beam ID based on the information on the received signal quality of each of the beams acquired from the received signal quality measurer 20 in Step S117, the STA's transmission beam ID being used by the STA for subsequent transmissions to the AP. The determination of the STA's transmission beam ID in Step S120 may be performed in the same manner as the determination of the AP's transmission beam ID in Step S119.

In Step S121, the training protocol controller 12 outputs a request for generation of a fifth protocol control frame to the protocol control frame generator 13 to notify the STA of the STA's transmission beam ID selected in Step S120 and the received signal quality information, and the transmitter 15 transmits a fifth protocol control frame generated by the protocol control frame generator 13 to the STA using the transmission beam ID determined in Step S119. The fifth protocol control frame corresponds to the SSW-Feedback frame 73 shown in FIG. 13.

In Step S122, the training protocol controller 12 determines whether a sixth protocol control frame has been received from the STA. As described earlier, the sixth protocol control frame corresponds to the SSW-ACK frame 74 shown in FIG. 13. When it is determined that the sixth protocol control frame has been received (S122: YES), the training protocol controller 12 outputs an instruction to end the beamforming training to the MAC controller 11 and ends the beamforming training procedure. Otherwise (S122: NO), the procedure repeats Step S122.

<Operation of the STA>

The following describes an example of how the wireless communication device 102 (103) operates during the beamforming training procedure in the communication system 100 when the wireless communication device 102 (103) acts as an STA.

Figure 18A:
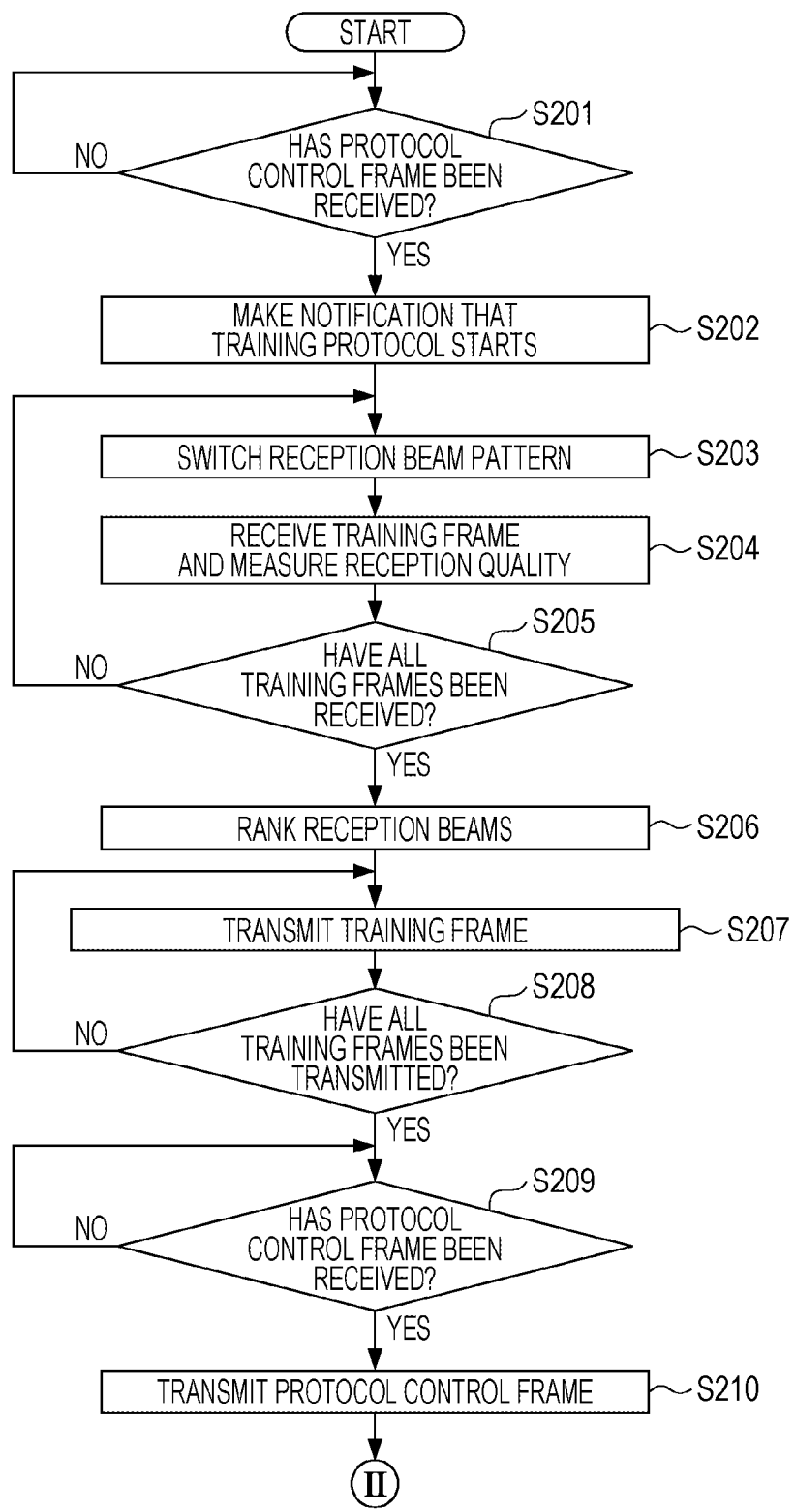
FIGS. 18A and 18B show examples of how an STA operates when the STA acts as a responder.
Figure 18B:
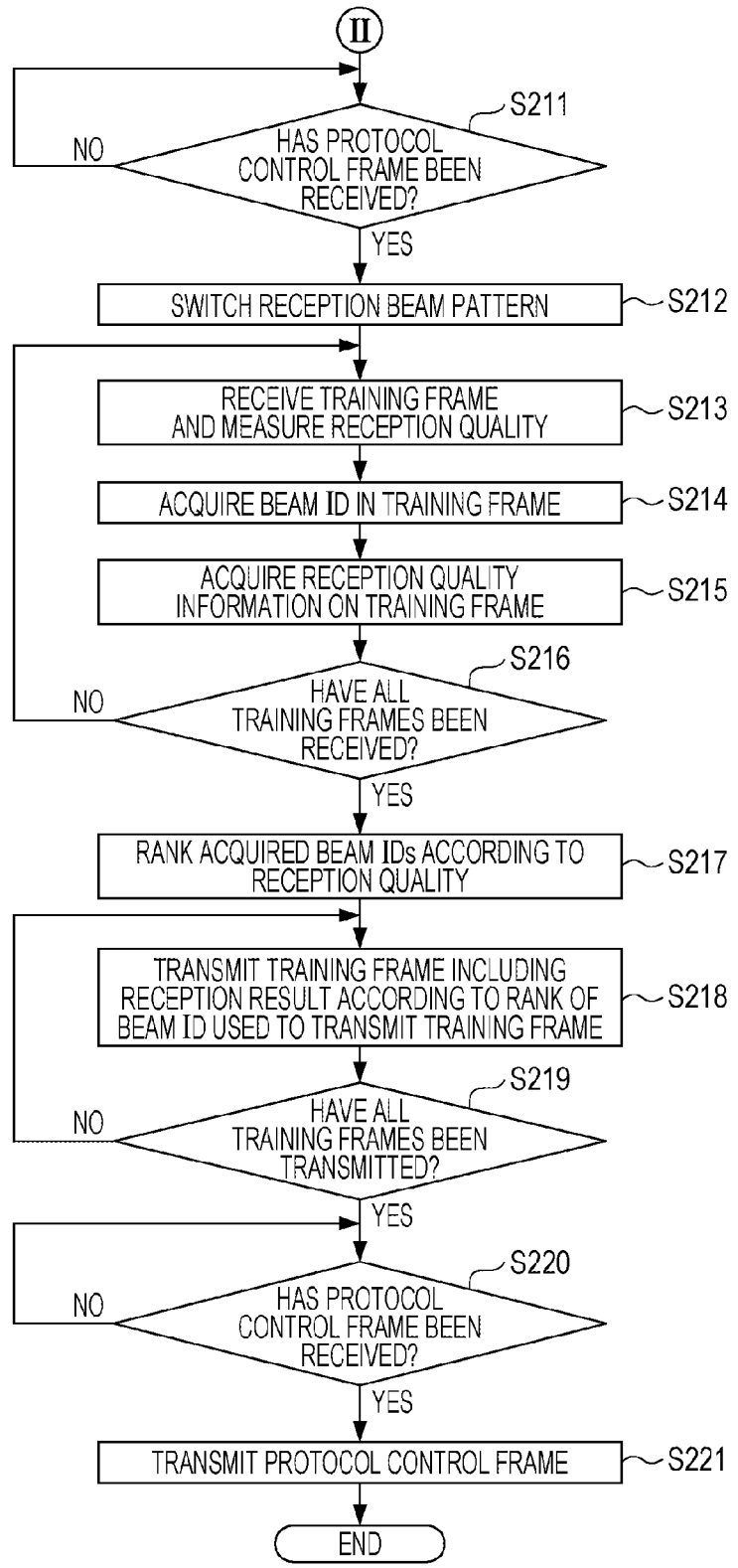

In the following description, as in the case of the AP's operation, the AP is an initiator transmitting a connection request, and the STA is a responder receiving the connection request. FIGS. 18A and 18B are flowchart illustrating an example of how the STA, the responder, operates.

[RXSS (Steps S201 to S209)]

In Step S201, the received frame filter unit 19 determines whether a first protocol control frame has been received. When determining that a first protocol control frame has been received (S201: YES), the received frame filter unit 19 outputs the first protocol control frame to the MAC controller 11. Otherwise (S201: NO), the procedure repeats Step S201. As described earlier, the first protocol control frame corresponds to the Grant frame 60 shown in FIG. 7, and contains an identifier (beamforming protocol ID) indicating that the beamforming protocol according to the embodiment of the present disclosure starts.

In Step S202, based on the first protocol control frame, the MAC controller 11 outputs a signal to the training protocol controller 12 to indicate that the beamforming training protocol starts.

In Step S203, the training protocol controller 12 outputs a reception beam switch instruction to the receiver 18 to switch a reception beam pattern for each of first training frames from the AP. As described earlier, the first training frames correspond to the first to fifth SSW frames 61A to 61E shown in FIG. 7.

In Step S204, the training protocol controller 12 causes the receiver 18 to receive a first training frame transmitted by the AP using the reception beam pattern switched, and causes the received signal quality measurer 20 to measure the received signal quality of the beam used to receive the first training frame.

In Step S205, the training protocol controller 12 determines whether all the first training frames have been received. The procedure proceeds to Step S206 when it is determined that all the first training frames have been received (S205: YES), or proceeds back to Step S203 otherwise (S205: NO).

In Step S206, the training protocol controller 12 ranks the beams used to receive the respective first training frames based on information on the received signal quality measured in Step S204. The beam management table 21 manages the beam IDs of the beams used for the receptions, the received signal quality information on the beams, and the ranks of the beams.

In Step S207, the training protocol controller 12 outputs a request for generation of second training frames to the training frame generator 14. In response, the training frame generator 14 generates multiple second training frames, and the transmitter 15 transmits each of the thus-generated second training frames to the AP while switching among the beam patterns to use for the transmissions. The second training frames correspond to the sixth to tenth SSW frames 62A to 62E shown in FIG. 7.

In Step S208, the training protocol controller 12 determines whether all the second training frames have been transmitted. The procedure proceeds to Step S209 when it is determined that all the second training frames have been transmitted (S208: YES), or proceeds back to Step S207 otherwise (Step S208: NO).

In Step S209, the training protocol controller 12 determines whether a second protocol control frame has been received from the AP. As described earlier, the second protocol control frame corresponds to the SSW-Feedback frame 63 shown in FIG. 7. The procedure proceeds to Step S210 when it is determined that the second protocol control frame has been received (S209: YES), or repeats Step S209 otherwise (S209: NO).

In Step S210, the training protocol controller 12 outputs a request for generation of a third protocol control frame to the protocol control frame generator 13, and causes the transmitter 15 to transmit a third protocol control frame generated by the protocol control frame generator 13 to the AP. As described earlier, the third protocol control frame corresponds to the SSW-ACK frame 64 shown in FIG. 7.

[TXSS (Steps S211 to S221)]

In Step S211, the training protocol controller 12 determines whether a fourth protocol control frame has been received from the STA. As described earlier, the fourth protocol control frame corresponds to the Grant frame 70 shown in FIG. 13, and contains an identifier (a beamforming protocol ID) indicating that the beamforming protocol starts. The procedure proceeds to Step S212 when it is determined that the fourth protocol control frame has been received (S211: YES), or repeats Step S211 otherwise (S211: NO).

In Step S212, the training protocol controller 12 outputs a reception beam switch instruction to the receiver 18 to switch and use an omnidirectional beam pattern for receptions of third training frames transmitted by the AP. The third training frames correspond to the 11th to 15th SSW frames 71A to 71E shown in FIG. 13.

In Step S213, the training protocol controller 12 causes the receiver 18 to receive a third training frame transmitted by the AP using the omnidirectional beam pattern, and causes the received signal quality measurer 20 to measure the received signal quality of the beam used.

In Step S214, the training protocol controller 12 acquires, from the received frame filter unit 19, the ID of a beam used by the AP to transmit the third training frame received in Step S213 (AP's transmission beam ID).

In Step S215, the training protocol controller 12 acquires information on the received signal quality measured in Step S213 from the received signal quality measurer 20.

In Step S216, the training protocol controller 12 determines whether all the third training frames have been received. The procedure proceeds to Step S217 when it is determined that all the third training frames have been received (S216: YES), or proceeds back to Step S213 otherwise (S216: NO).

In Step S217, based on the received signal quality information acquired in Step S215, the training protocol controller 12 ranks the beams used by the AP to transmit the respective third training frames according to received signal quality. The beam management table 21 manages the beam IDs of the beams used by the AP for the receptions, the received signal quality information on the beams, and the ranks of the beams.

In Step S218, the training protocol controller 12 outputs a request for generation of fourth training frames to the training frame generator 14. The fourth training frames correspond to the 16th to 20th SSW frames 72A to 72E shown in FIG. 13, and respectively contain, as described earlier, reception result information generated in Step S217, including the received signal quality information on beams used by the AP to transmit the third training frames, as well as the ranks of the beams.

In Step S218, the training protocol controller 12 causes the beam determiner 22 to determine the rank of a beam pattern to use to transmit a fourth training frame generated by the training frame generator 14, based on the ranks of the beams used to receive the first training frames determined in Step S206. The transmitter 15 transmits the thus-generated fourth training frame to the AP using the rank of the transmission beam pattern determined by the beam determiner 22.

In Step S219, the training protocol controller 12 determines whether all the fourth training frames have been transmitted. The procedure proceeds to Step S220 when it is determined that all the fourth training frames have been transmitted (S219: YES), or proceeds back to Step S218 otherwise (S219: NO).

In Step S220, the training protocol controller 12 determines whether a fifth protocol control frame has been received from the AP. As described earlier, the fifth protocol control frame corresponds to the SSW-Feedback frame 73 shown in FIG. 13, and contains information on the STA's transmission beam ID to be used by the STA for subsequent transmissions to the AP, which has been determined by the AP in Step S120 in FIG. 17B. After this step, the STA uses the acquired transmission beam ID for transmissions to the AP.

The procedure proceeds to Step S221 when it is determined in Step S220 that the fifth protocol control frame has been received (Step S220: YES), or repeats Step S220 otherwise (Step S220: NO).

In Step S221, the training protocol controller 12 outputs a request for generation of a sixth protocol control frame to the protocol control frame generator 13, and causes the transmitter 15 to transmit a sixth protocol control frame generated by the protocol control frame generator 13 to the AP. As described earlier, the sixth protocol control frame corresponds to the SSW-ACK frame 74 shown in FIG. 13.

As described thus far, the communication system 100 according to the embodiment of the present disclosure is configured as follows. In the RXSS for determining reception beam patterns (the reception beamforming training period), the STA measures the received signal quality of the first training frames received from the AP, and according to the received signal quality, ranks beam patterns used by the STA to receive the first training frames. Following the RXSS, in the TXSS for determining transmission beam patterns (the transmission beamforming training period), the STA measures the received signal quality of the third training frames received from the AP, and according to the received signal quality, ranks beam patterns used by the AP to transmit the third training frames. Then, the STA transmits the fourth training frames respectively containing measurement results on the received signal quality of the third training frames based on the ranks of the first training frames determined according to the received signal quality.

The thus-configured communication system 100 according to the embodiment of the present disclosure allows the AP to be informed of the received signal quality of the first training frames transmitted by the AP and received by the STA without changing the frame length of the training frames. Thus, beamforming training can be performed without decreasing communication efficiency even in an environment where, for example, multiple wireless communication systems adjacently exist.

Further, in the communication system 100 according to the embodiment of the present disclosure where the TXSS is performed immediately after the RXSS, there is almost no change in the positional relation between the AP and the STA. Thus, the ranks of the STA's reception beam patterns determined according to the received signal quality of the first training frames can be used as the ranks of the STA's transmission beam patterns, as well.

Although various embodiments have been described above with reference to the drawings, it goes without saying that the present disclosure is not limited to these embodiments. It is apparent that those skilled in the art may conceive of various modifications and alterations within the scope of the claims, and naturally, such modifications and alterations, too, belong to the technical scope of the present disclosure. The elements of the above embodiment may be combined in any way without departing from the gist of the disclosure.

Figure 19:
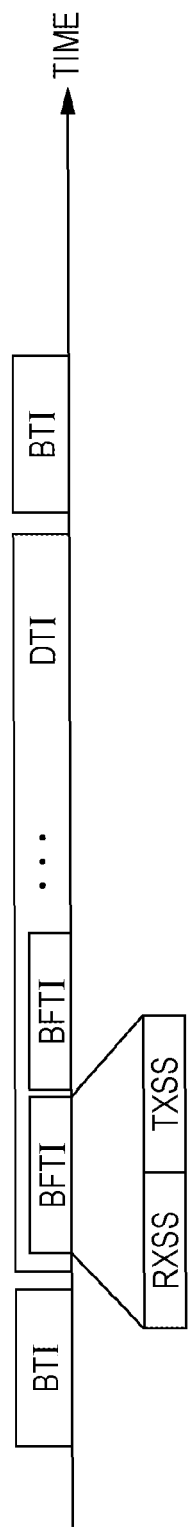
FIG. 19 shows an example of the beamforming protocol control with two STAs.

Although the communication system 100 has one AP and one STA in the embodiment described above, the present disclosure is not limited to this. For example, the communication system according to the present disclosure may have more than one AP and more than one STA. In a case where a certain AP communicates with multiple STAs, the RXSS and the TXSS may be performed with the STAs one by one as many times as the STAs. FIG. 19 is a sequence diagram showing an example of beamforming protocol control for two STAs.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

<Summary of the Present Disclosure>

A communication system of the present disclosure is a communication system comprising a terminal device and a base station device that wirelessly communicates with the terminal device, wherein: in a reception beamforming training period, the base station device transmits a plurality of first training frames to the terminal device, the terminal device receives the first training frames while switching among a plurality of reception beam patterns for the respective first training frames, the terminal device transmits a plurality of second training frames to the base station device, and the base station device receives the second training frames while switching among a plurality of reception beam patterns for the respective second training frames; in a transmission beamforming training period following the reception beamforming training period, the base station device transmits a plurality of third training frames to the terminal device while switching among a plurality of transmission beam patterns for the respective third training frames, the terminal device receives the third training frames, the terminal device transmits a plurality of fourth training frames to the base station device while switching among a plurality of transmission beam patterns for the respective fourth training frames, and the base station device receives the fourth training frames; the terminal device measures first received signal qualities of the respective first training frames, determines first ranks of the respective reception beam patterns used for the first training frames based on the first received signal qualities measured, and sets the determined first ranks as second ranks of the respective transmission beam patterns used for the fourth training frames; the terminal device measures third received signal qualities of the respective third training frames, and determines third ranks of the respective third received signal qualities measured; and the terminal device transmits the third received signal qualities to the base station device along with the respective fourth training frames by associating the third ranks with the second ranks in the respective fourth training frames.

In the communication system of the present disclosure, based on the third received signal quality transmitted along with the fourth training frames, the base station device determines a transmission beam pattern for the base station device to use for transmissions to the terminal device.

In the communication system of the present disclosure, the base station device measures second received signal qualities of the respective second training frames, measures fourth received signal qualities of the respective fourth training frames, and based on at least either of the second received signal qualities and the fourth received signal qualities, determines a transmission beam pattern for the terminal device to use for transmissions to the base station device.

In the communication system of the present disclosure, the base station device and the terminal device perform wireless communications conforming to IEEE 802.11ad.

In the communication system of the present disclosure, the base station device transmits a frame containing an identifier indicating initiation of beamforming training to the terminal device when starting the reception beamforming training period and when starting the transmission beamforming training period.

In the communication system of the present disclosure, the received signal qualities are each one or a combination of received signal strength indicator (RSSI), signal to noise ratio (SNR), signal-to-interference plus noise power ratio (SINR), bit error rate (BER), packet error rate (PER), and frame error rate (FER).

In the communication system of the present disclosure, after the reception beamforming training period and the transmission training frame period are performed between the base station device and the terminal device, a reception beamforming training period and a transmission beamforming training period are performed between the base station device and another terminal device.

A communication method of the present disclosure comprises: in a reception beamforming training period, by a base station device, transmitting a plurality of first training frames to a terminal device; by the terminal device, receiving the first training frames while switching among a plurality of reception beam patterns for the respective first training frames; by the terminal device, transmitting a plurality of second training frames to the base station device; and by the base station device, receiving the second training frames while switching among a plurality of reception beam patterns for the respective second training frames; in a transmission beamforming training period following the reception beamforming training period, by the base station device, transmitting a plurality of third training frames to the terminal device while switching among a plurality of transmission beam patterns for the respective third training frames; by the terminal device, receiving the third training frames; by the terminal device, transmitting a plurality of fourth training frames to the base station device while switching among a plurality of transmission beam patterns for the respective fourth training frames; and by the base station device, receiving the fourth training frames, wherein the terminal device measures first received signal qualities of the respective first training frames, determines first ranks of the respective reception beam patterns used for the first training frames based on the first received signal qualities measured, and sets the determined first ranks as second ranks of the respective transmission beam patterns used for the fourth training frames, the terminal device measures third received signal qualities of the respective third training frames, and determines third ranks of the third received signal qualities measured, and the terminal device transmits the third received signal qualities to the base station device along with the respective fourth training frames by associating the third ranks with the second ranks in the respective fourth training frames.

A base station device of the present disclosure comprises: a transmitter that, in a reception beamforming training period, transmits a plurality of first training frames to a terminal device which then receives the first training frames while switching among a plurality of reception beam patterns for the respective first training frames; a receiver that, in the reception beamforming training period, receives a plurality of second training frames transmitted by the terminal device, while the receiver switches among a plurality of reception beam patterns for the respective second training frames; and a beam determiner that determines a transmission beam pattern to use for transmissions to the terminal device, wherein in a transmission beamforming training period following the reception beamforming training period, the transmitter transmits a plurality of third training frames to the terminal device while switching among a plurality of transmission beam patterns for the respective third training frames, the receiver receives a plurality of fourth training frames transmitted by the terminal device while switching among a plurality of transmission beam patterns for the respective fourth training frames, first ranks of the respective reception beam patterns used for the first training frames are determined based on first received signal qualities of the respective first training frames, and are set as second ranks of the respective transmission beam patterns used for the fourth training frames, third received signal qualities are measured for the respective third training frames, third ranks of the third received signal qualities measured are determined, and the beam determiner determines the transmission beam pattern based on the third received signal qualities transmitted along with the fourth training frames in which the third ranks are associated with the second ranks.

A terminal device of the present disclosure comprises: a receiver that, in a reception beamforming training period, receives a plurality of first training frames transmitted by a base station device, while the receiver switches among a plurality of reception beam patterns for the first training frames; a transmitter that, in the reception beamforming training period, transmits a plurality of second training frames to the base station device which then receives the second training frames while switching among a plurality of reception beam patterns for the second training frames; and a measurer that measures first received signal qualities of the respective first training frames, wherein in a transmission beamforming training period following the reception beamforming training period, the receiver receives a plurality of third training frames transmitted by the base station device while switching among a plurality of transmission beam patterns for the respective third training frames, the transmitter transmits a plurality of fourth training frames to the base station device while switching among a plurality of transmission beam patterns for the respective fourth training frames, the measurer determines first ranks of the respective reception beam patterns used for the first training frames based on the first received signal qualities, and sets the determined first ranks as second ranks of the respective transmission beam patterns used for the fourth training frames, the measurer measures third received signal qualities of the respective third training frames, and determines third ranks of the third received signal qualities measured, and the transmitter transmits the third received signal qualities to the base station device along with the respective fourth training frames by associating the third ranks with the second ranks in the respective fourth training frames.

The present disclosure is suitable for a communication system that performs beamforming training.

What is claimed is:

1. A communication system comprising:
a terminal device; and
a base station device that wirelessly communicates with the terminal device, wherein
in a reception beamforming training period,
the base station device, in operation, transmits a plurality of first training frames to the terminal device, the terminal device, in operation, receives the first training frames by switching among a plurality of first reception beam patterns, the terminal device, in operation, transmits a plurality of second training frames to the base station device, and the base station device, in operation, receives the second training frames by switching among a plurality of second reception beam patterns,
in a transmission beamforming training period following the reception beamforming training period,
the base station device, in operation, transmits a plurality of third training frames to the terminal device by switching among a plurality of first transmission beam patterns, the terminal device, in operation, receives the third training frames, the terminal device, in operation, transmits a plurality of fourth training frames to the base station device by switching among a plurality of second transmission beam patterns, and the base station device, in operation, receives the fourth training frames,
the terminal device, in operation, measures first received signal qualities of the respective first training frames, determines first ranks of the respective first reception beam patterns used for the first training frames based on the first received signal qualities measured, and sets the determined first ranks as second ranks of the respective second transmission beam patterns used for the fourth training frames,
the terminal device, in operation, measures third received signal qualities of the respective third training frames, and determines third ranks of the respective third received signal qualities measured, and
the terminal device, in operation, transmits the third received signal qualities to the base station device in the respective fourth training frames by associating the third ranks with the second ranks in the respective fourth training frames.

2. The communication system according to claim 1, wherein
based on the third received signal quality transmitted in the fourth training frames, the base station device, in operation, determines a transmission beam pattern for the base station device to use for transmissions to the terminal device.

3. The communication system according to claim 1, wherein
the base station device, in operation, measures second received signal qualities of the respective second training frames, measures fourth received signal qualities of the respective fourth training frames, and based on at least either of the second received signal qualities and the fourth received signal qualities, determines a transmission beam pattern for the terminal device to use for transmissions to the base station device.

4. The communication system according to claim 1, wherein
the base station device and the terminal device, in operation, perform wireless communications conforming to IEEE 802.11ad.

5. The communication system according to claim 1, wherein
the base station device, in operation, transmits a frame containing an identifier indicating initiation of beamforming training to the terminal device when starting the reception beamforming training period and when starting the transmission beamforming training period.

6. The communication system according to claim 1, wherein
the first received signal qualities and the third received signal qualities are each one or a combination of received signal strength indicator (RSSI), signal to noise ratio (SNR), signal-to-interference plus noise power ratio (SINR), bit error rate (BER), packet error rate (PER), and frame error rate (FER).

7. The communication system according to claim 1, wherein
after the reception beamforming training period and the transmission training frame period are performed between the base station device and the terminal device, a reception beamforming training period and a transmission beamforming training period are performed between the base station device and another terminal device.

8. A communication method comprising:
in a reception beamforming training period,
by a base station device, transmitting a plurality of first training frames to a terminal device;
by the terminal device, receiving the first training frames by switching among a plurality of first reception beam patterns;
by the terminal device, transmitting a plurality of second training frames to the base station device; and
by the base station device, receiving the second training frames by switching among a plurality of second reception beam patterns;
in a transmission beamforming training period following the reception beamforming training period,
by the base station device, transmitting a plurality of third training frames to the terminal device by switching among a plurality of first transmission beam patterns;
by the terminal device, receiving the third training frames;
by the terminal device, transmitting a plurality of fourth training frames to the base station device by switching among a plurality of second transmission beam patterns; and
by the base station device, receiving the fourth training frames, wherein
the terminal device measures first received signal qualities of the respective first training frames, determines first ranks of the respective first reception beam patterns used for the first training frames based on the first received signal qualities measured, and sets the determined first ranks as second ranks of the respective second transmission beam patterns used for the fourth training frames,
the terminal device measures third received signal qualities of the respective third training frames, and determines third ranks of the third received signal qualities measured, and
the terminal device transmits the third received signal qualities to the base station device in the respective fourth training frames by associating the third ranks with the second ranks in the respective fourth training frames.

9. A base station device comprising:
a transmitter, which, in operation, in a reception beamforming training period, transmits a plurality of first training frames to a terminal device, the terminal device then receiving the first training frames by switching among a plurality of first reception beam patterns;
a receiver, which, in operation, in the reception beamforming training period, receives a plurality of second training frames, which are transmitted by the terminal device, by switching among a plurality of second reception beam patterns; and
a beam determiner that determines a transmission beam pattern to use for transmissions to the terminal device, wherein
in a transmission beamforming training period following the reception beamforming training period,
the transmitter, in operation, transmits a plurality of third training frames to the terminal device by switching among a plurality of first transmission beam patterns,
the receiver, in operation, receives a plurality of fourth training frames, which are transmitted by the terminal device by switching among a plurality of second transmission beam patterns,
first ranks of the respective first reception beam patterns used for the first training frames are determined based on first received signal qualities of the respective first training frames by the terminal device, and are set as second ranks of the respective second transmission beam patterns used for the fourth training frames by the terminal device,
third received signal qualities are measured for the respective third training frames by the terminal device,
third ranks of the third received signal qualities measured are determined by the terminal device, and
the beam determiner determines the transmission beam pattern based on the third received signal qualities transmitted in the respective fourth training frames in which the third ranks are associated with the second ranks.

10. A terminal device comprising:
a receiver, which, in operation, in a reception beamforming training period, receives a plurality of first training frames, which are transmitted by a base station device, by switching among a plurality of first reception beam patterns;
a transmitter, which, in operation, in the reception beamforming training period, transmits a plurality of second training frames to the base station device, the base station device then receiving the second training frames by switching among a plurality of second reception beam patterns; and a measurer, which, in operation, measures first received signal qualities of the respective first training frames, wherein in a transmission beamforming training period following the reception beamforming training period, the receiver, in operation, receives a plurality of third training frames, which are transmitted by the base station device by switching among a plurality of first transmission beam patterns, the transmitter, in operation, transmits a plurality of fourth training frames to the base station device by switching among a plurality of second transmission beam patterns, the measurer, in operation, determines first ranks of the respective first reception beam patterns used for the first training frames based on the first received signal qualities, and sets the determined first ranks as second ranks of the respective second transmission beam patterns used for the fourth training frames, the measurer, in operation, measures third received signal qualities of the respective third training frames, and determines third ranks of the third received signal qualities measured, and the transmitter, in operation, transmits the third received signal qualities to the base station device in the respective fourth training frames by associating the third ranks with the second ranks in the respective fourth training frames.

* * * * *